United States Patent
Jia

(10) Patent No.: US 12,307,683 B2
(45) Date of Patent: May 20, 2025

(54) SUBJECT DETECTING METHOD AND DEVICE, ELECTRONIC DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 644 days.

(21) Appl. No.: 17/711,455

(22) Filed: Apr. 1, 2022

(65) Prior Publication Data
US 2022/0222830 A1 Jul. 14, 2022

Related U.S. Application Data

(63) Continuation of application No. PCT/CN2020/120116, filed on Oct. 10, 2020.

(30) Foreign Application Priority Data

Oct. 29, 2019 (CN) .......................... 201911038668.4

(51) Int. Cl.
*G06T 7/20* (2017.01)
*G06T 7/10* (2017.01)

(52) U.S. Cl.
CPC . *G06T 7/20* (2013.01); *G06T 7/10* (2017.01)

(58) Field of Classification Search
CPC .. G06T 7/20; G06T 7/10; G06V 20/52; G06V 10/62; H04N 23/61; H04N 23/675; H04N 23/64; H04N 23/80
See application file for complete search history.

(56) References Cited

U.S. PATENT DOCUMENTS

2011/0081043 A1* 4/2011 Sabol ...................... G06T 7/254
382/103
2012/0045094 A1* 2/2012 Kubota ................ H04N 23/611
382/103

(Continued)

FOREIGN PATENT DOCUMENTS

CN    1621775    6/2005
CN    104243825    12/2014

(Continued)

OTHER PUBLICATIONS

WIPO, International Search Report for PCT/CN2020/120116, Dec. 31, 2020.

(Continued)

*Primary Examiner* — Phuoc Tran
(74) *Attorney, Agent, or Firm* — Hodgson Russ LLP

(57) ABSTRACT

A subject detecting method, including: acquiring a current-frame image, and detecting whether the current-frame image has a focus frame triggered by a user; in response to the current-frame image having the focus frame, determining a target subject of the current-frame image based on an image in the focus frame; and in response to the current-frame image not having the focus frame, acquiring a tracking frame of a previous-frame image previous to the current-frame image, determining a first center weight map based on the tracking frame, and obtaining the target subject of the current-frame image by traversing the current-frame image based on the first center weight map. Weight values of the first center weight map are gradually reduced from a center to each edge thereof, and the tracking frame shows a region where the target subject is located in the previous-frame image.

20 Claims, 6 Drawing Sheets

(56) References Cited

U.S. PATENT DOCUMENTS

| | | | | |
|---|---|---|---|---|
| 2015/0055006 A1* | 2/2015 | Kim | ................... | H04N 23/635 |
| | | | | 348/333.11 |
| 2020/0124940 A1* | 4/2020 | Shimada | ................ | G03B 13/36 |
| 2020/0412937 A1 | 12/2020 | Huang | | |

FOREIGN PATENT DOCUMENTS

| | | |
|---|---|---|
| CN | 104966304 | 10/2015 |
| CN | 105894538 | 8/2016 |
| CN | 107066990 | 8/2017 |
| CN | 108986140 | 12/2018 |
| CN | 109671103 | 4/2019 |
| CN | 110120065 A | 8/2019 |
| CN | 110191287 | 8/2019 |
| CN | 110248096 | 9/2019 |
| CN | 110661977 | 1/2020 |
| EP | 1533996 | 5/2005 |

OTHER PUBLICATIONS

CNIPA, First Office Action for CN Application No. 201911038668.4, Nov. 24, 2020.

EPO, Supplementary European Search Report for EP Application No. 20881883.1, Oct. 27, 2022.

EPO, Communication for EP Application No. 20881883.1, May 27, 2024.

\* cited by examiner

SUBJECT DETECTING METHOD AND DEVICE, ELECTRONIC DEVICE, AND NON-TRANSITORY COMPUTER-READABLE STORAGE MEDIUM

CROSS REFERENCE TO RELATED APPLICATIONS

The present disclosure is a continuation of International Patent Application No. PCT/CN2020/120116, filed Oct. 10, 2020, which claims priority to Chinese Patent Application No. 201911038668.4, filed Oct. 29, 2019, the entire disclosures of which are incorporated herein by reference.

TECHNICAL FIELD

The present disclosure relates to the technical field of computers, in particular to a subject detecting method and device, an electronic device, and a non-transitory computer-readable storage medium.

BACKGROUND

With the development of imaging technology, people are becoming more and more accustomed to taking images or videos and recording various information through image acquisition devices such as cameras of electronic devices. After an image is acquired by the electronic device, a subject detecting process tend to be performed for the image to detect the subject, so as to obtain a clear image of the subject. However, there is an inaccurate problem in response to the image being detected by the traditional subject detecting technology.

SUMMARY OF THE DISCLOSURE

A subject detecting method and device, an electronic device, and a non-transitory computer-readable storage medium are provided in the embodiments of the present disclosure.

According to a first aspect, a subject detecting method is provided and includes the following operations. A current-frame image is acquired, and that whether the current-frame image has a focus frame triggered by a user, is detected. In response to the current-frame image having the focus frame, a target subject of the current-frame image is determined based on an image in the focus frame. In response to the current-frame image not having the focus frame, a tracking frame of a previous-frame image previous to the current-frame image is acquired, a first center weight map is determined based on the tracking frame of the previous-frame image, and the target subject of the current-frame image is obtained by traversing the current-frame image based on the first center weight map. Each of pixels of the first center weight map has a corresponding weight value, weight values of the pixels of the first center weight map are gradually reduced from a center to each edge thereof, and the tracking frame shows a region where the target subject is located in the previous-frame image.

According to a second aspect, a subject detecting device is provided and includes an acquisition module configured to acquire a current-frame image and detect whether the current-frame image has a focus frame triggered by a user; a first determining module configured to, in response to the current-frame image having the focus frame, determine a target subject of the current-frame image based on an image in the focus frame; and a second determining module configured to, in response to the current-frame image not having the focus frame, acquire a tracking frame of a previous-frame image previous to the current-frame image, determine a first center weight map based on the tracking frame of the previous-frame image, and obtain the target subject of the current-frame image by traversing the current-frame image based on the first center weight map. Each of pixels of the first center weight map has a corresponding weight value, weight values of the pixels of the first center weight map are gradually reduced from a center to each edge thereof, and the tracking frame shows a region where the target subject is located in the previous-frame image.

According to a third aspect, an electronic device is provided and includes a memory configured to store computer programs, and a processor. When the computer programs are executed by the processor, the processor is configured to perform the following operations. A current-frame image is acquired, and that whether the current-frame image has a focus frame triggered by a user, is detected. In response to the current-frame image having the focus frame, a target subject of the current-frame image is determined based on an image in the focus frame. In response to the current-frame image not having the focus frame, a tracking frame of a previous-frame image previous to the current-frame image is acquired, a first center weight map is determined based on the tracking frame of the previous-frame image, and the target subject of the current-frame image is obtained by traversing the current-frame image based on the first center weight map. Each of pixels of the first center weight map has a corresponding weight value, weight values of the pixels of the first center weight map are gradually reduced from a center to each edge thereof, and the tracking frame shows a region where the target subject is located in the previous-frame image.

According to a fourth aspect, a non-transitory computer-readable storage medium is provided and configured to store computer programs. When the computer programs are executed by a processor, the following operations are performed. A current-frame image is acquired, and that whether the current-frame image has a focus frame triggered by a user, is detected. In response to the current-frame image having the focus frame, a target subject of the current-frame image is determined based on an image in the focus frame. In response to the current-frame image not having the focus frame, a tracking frame of a previous-frame image previous to the current-frame image is acquired, a first center weight map is determined based on the tracking frame of the previous-frame image, and the target subject of the current-frame image is obtained by traversing the current-frame image based on the first center weight map. Each of pixels of the first center weight map has a corresponding weight value, weight values of the pixels of the first center weight map are gradually reduced from a center to each edge thereof, and the tracking frame shows a region where the target subject is located in the previous-frame image.

BRIEF DESCRIPTION OF THE DRAWINGS

In order to more clearly describe the technical solutions in the embodiments of the present disclosure, the following will briefly introduce the drawings required in the description of the embodiments. Obviously, the drawings in the following description are only some embodiments of the present disclosure. For those skilled in the art, other drawings can be obtained based on these drawings without creative work.

DETAILED DESCRIPTION

Figure 1:
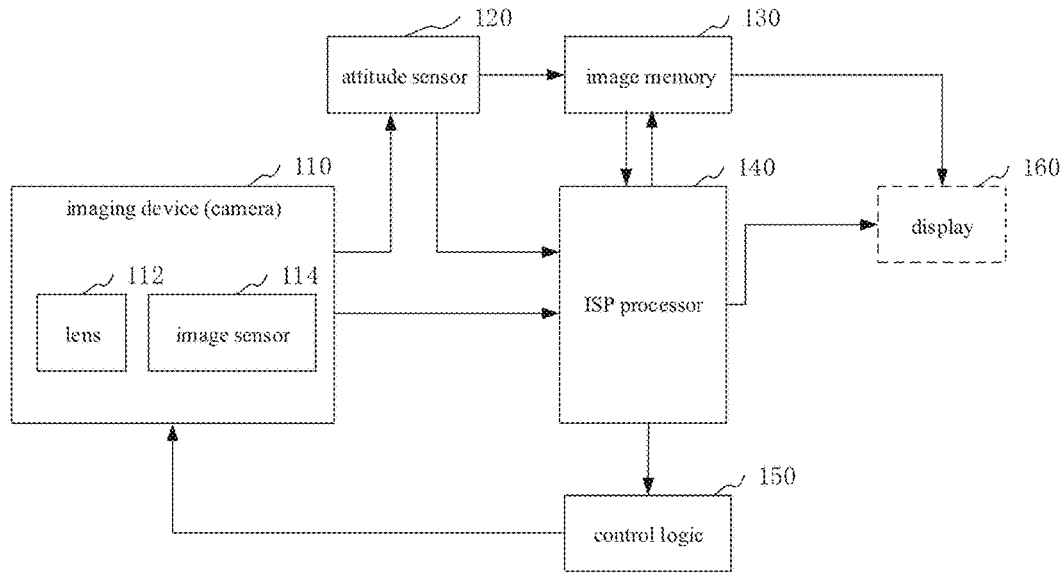
FIG. 1 is a schematic diagram of an image processing circuit according to some embodiments.

For convenience to understand the present disclosure, the present disclosure will be described more fully in the following with reference to related accompanying drawings. Preferred embodiments of the present disclosure are shown in the accompanying drawings. However, the present disclosure may be implemented in many different forms and is not limited to the embodiments described herein. On the contrary, a purpose of providing these embodiments is to make an understanding for the disclosure of the present invention more thorough and comprehensive.

It can be understood that the terms "first", "second", etc. used in the present disclosure may be used herein to describe various elements, but these elements are not limited by these terms. These terms are only used to distinguish a first element from another element. For example, without departing from a scope of the present disclosure, the first body region may be referred to as the second body region, and similarly, the second body region may be referred to as the first body region. Both the first body region and the second body region are subject regions, but they are not the same subject region.

According to a first aspect of the present disclosure, a subject detecting method is provided and includes: acquiring a current-frame image, and detecting whether the current-frame image has a focus frame triggered by a user; in response to the current-frame image having the focus frame, determining a target subject of the current-frame image based on an image in the focus frame; and in response to the current-frame image not having the focus frame, acquiring a tracking frame of a previous-frame image previous to the current-frame image, determining a first center weight map based on the tracking frame of the previous-frame image, and obtaining the target subject of the current-frame image by traversing the current-frame image based on the first center weight map; each of pixels of the first center weight map has a corresponding weight value, weight values of the pixels of the first center weight map are gradually reduced from a center to each edge thereof, and the tracking frame shows a region where the target subject is located in the previous-frame image.

In some embodiments, the operation of obtaining the target subject of the current-frame image by traversing the current-frame image based on the first center weight map includes: obtaining a plurality of candidate frames by sliding the first center weight map on the current-frame image; acquiring a first image feature of each of the candidate frames, obtaining a response value corresponding to each of the candidate frames by performing a convolution process for the first image feature of each of the candidate frames with a target filter; and determining the target subject of the current-frame image based on a candidate frame corresponding to a maximal one of response values.

In some embodiments, the operation of acquiring the first image feature of each of the candidate frames includes: acquiring a second image feature of each of the candidate frames, the second image feature including pixel values of pixels of each of the candidate frames obtained by sliding the first center weight map on the current-frame image; and performing a point multiplication process for a pixel value of each of the pixels of each of the candidate frames with a weight value of a corresponding pixel of the first center weight map, and obtaining the first image feature of each of the candidate frames.

In some embodiments, the operation of performing the point multiplication process for the pixel value of each of the pixels of each of the candidate frames with the weight value of the corresponding pixel of the first center weight map, includes: performing a logarithm operation process for the pixel value of each of the pixels of each of the candidate frames; and performing the point multiplication process for the pixel value of each of the pixels of each of the candidate frames, which has been processed by the logarithm operation process, with the weight value of the corresponding pixel of the first center weight map.

In some embodiments, the operation of determining the target subject of the current-frame image based on the candidate frame corresponding to the maximal one of the response values, includes: taking a candidate frame corresponding to the maximal one of the response values as a first subject region of the current-frame image; inputting the first subject region of the current-frame image into a subject segmentation network, and obtaining the target subject of the current-frame image.

In some embodiments, the operation of the taking the candidate frame corresponding to the maximal one of the response values as the first subject region of the current-frame image, includes: determining a height and a width of the candidate frame corresponding to the maximal one of the response values; adding the height of the candidate frame with a preset height, and adding the width of the candidate frame with a preset width; and taking a candidate frame obtained by adding with the preset height and the preset width as the first subject region of the current-frame image.

In some embodiments, the operation of inputting the first subject region of the current-frame image into the subject segmentation network, and obtaining the target subject of the current-frame image, includes: detecting whether the current-frame image has a moving subject; in response to the current-frame image having the moving subject, acquiring a second subject region including the moving subject; performing a fusing process for the first subject region and the second subject region, inputting a subject region obtained by the fusing process into the subject segmentation network, and obtaining the target subject of the current-frame image.

In some embodiments, the operation of detecting whether the current-frame image has the moving subject, includes: performing a background subtraction process for the current-frame image, and obtaining a binary image corresponding to the current-frame image; performing a connected component process for the binary image, and obtaining an area size of each of candidate subjects in the binary image; in response to any one of the area size of each of the candidate subjects being larger than or equal to an area threshold, determining that the current-frame image has the moving subject; and in response to all the area size of each of the candidate subjects being less than the area threshold, determining that the current-frame image does not have the moving subject.

In some embodiments, after the obtaining the target subject of the current-frame image, the method further includes updating the target filter based on the first subject region of the current-frame image.

In some embodiments, the operation of the current-frame determining the target subject of the current-frame image based on the image in the focus frame, in response to the current-frame image having the focus frame, includes: in response to the current-frame image having the focus frame, determining a height and a width of the focus frame; adding the height of the focus frame with a preset height, and adding the width of the focus frame with a preset width; taking a focus frame obtained by adding with the preset height and the preset width as the first subject region of the current-frame image; inputting the first subject region of the current-frame image into the subject segmentation network, and obtaining the target subject in the current-frame image.

In some embodiments, the operation of inputting the first subject region of the current-frame image into the subject segmentation network, and obtaining the target subject of the current-frame image, includes: acquiring a subject segmentation image of the previous-frame image, inputting the subject segmentation image of the previous-frame image and the first subject region of the current-frame image into the subject segmentation network, and obtaining the target subject of the current-frame image.

In some embodiments, the operation of inputting the first subject region of the current-frame image into the subject segmentation network, and obtaining the target subject of the current-frame image, includes: acquiring a subject segmentation image of the previous-frame image, inputting the subject segmentation image of the previous-frame image and the first subject region of the current-frame image into the subject segmentation network, and obtaining a subject segmentation image of the current-frame image; determining a proportion of the subject segmentation image of the current-frame image relative to the current-frame image; and in response to the proportion of the subject segmentation image of the current-frame image relative to the current-frame image being less than a proportion threshold, inputting the current-frame image into the subject segmentation network, and obtaining the target subject of the current-frame image.

In some embodiments, the target filter is obtained by a manner, which includes: acquiring a second center weight map corresponding to the focus frame, each of pixels of the second center weight map having a corresponding weight value, and weight values of the pixels of the second center weight map being gradually reduced from a center to each edge thereof; performing a point multiplication process for a pixel value of each of the pixels of an image in the focus frame with a weight value of a corresponding pixel of the second center weight map; performing an affine transformation process for the image in the focus frame, which has been processed by the point multiplication process, and obtaining a preset number of images in transformation frames; and training an initial filter based on the preset number of images in the transformation frames, and obtaining the target filter in response to a preset condition being satisfied.

In some embodiments, the operation of performing the point multiplication process for the pixel value of each of the pixels of the image in the focus frame with the weight value of the corresponding pixel of the second center weight map, includes: performing a logarithm operation process for the pixel value of each of the pixels of the image in the focus frame; and performing the point multiplication process for the pixel value of each of the pixels of the image in the focus frame, which has been processed by the logarithm operation process, with the weight value of the corresponding pixel of the second center weight map.

In some embodiments, the operation of performing the point multiplication process for the pixel value of each of the pixels of the image in the focus frame, which has been processed by the logarithm operation process, with the weight value of the corresponding pixel of the second center weight map, includes: performing a normalization process for the pixel value of each of the pixels of the image in the focus frame, which has been processed by the logarithm operation process; and performing the point multiplication process for the pixel value of each of the pixels of the image in the focus frame, which has been processed by the normalization process, with the weight value of the corresponding pixel of the second center weight map.

According to a second aspect of the present disclosure, an electronic device is provided and includes: a memory configured to store computer programs; and a processor; when the computer programs are executed by the processor, the processor is configured to perform operations of: acquiring a current-frame image, and detecting whether the current-frame image has a focus frame triggered by a user; in response to the current-frame image having the focus frame, determining a target subject of the current-frame image based on an image in the focus frame; and in response to the current-frame image not having the focus frame, acquiring a tracking frame of a previous-frame image previous to the current-frame image, determining a first center weight map based on the tracking frame of the previous-frame image, and obtaining the target subject of the current-frame image by traversing the current-frame image based on the first center weight map; each of pixels of the first center weight map has a corresponding weight value, weight values of the pixels of the first center weight map are gradually reduced from a center to each edge thereof, and the tracking frame shows a region where the target subject is located in the previous-frame image.

In some embodiments, the processor is further configured to perform operations of: obtaining a plurality of candidate frames by sliding the first center weight map on the current-frame image; acquiring a first image feature of each of the candidate frames, obtaining a response value corresponding to each of the candidate frames by performing a convolution process for the first image feature of each of the candidate frames with a target filter; and determining the target subject of the current-frame image based on a candidate frame corresponding to a maximal one of response values.

In some embodiments, the processor is further configured to perform operations of: acquiring a second image feature of each of the candidate frames, the second image feature including pixel values of pixels of each of the candidate frames obtained by sliding the first center weight map on the current-frame image; and performing a point multiplication process for a pixel value of each of the pixels of each of the candidate frames with a weight value of a corresponding pixel of the first center weight map, and obtaining the first image feature of each of the candidate frames.

In some embodiments, the processor is further configured to perform operations of: performing a logarithm operation process for the pixel value of each of the pixels of each of the candidate frames; and performing the point multiplication process for the pixel value of each of the pixels of each of the candidate frames, which has been processed by the logarithm operation process, with the weight value of the corresponding pixel of the first center weight map.

According to a third aspect of the present disclosure, a non-transitory computer-readable storage medium is provided and configured to store computer programs, when the computer programs are executed by a processor, performing operations of: acquiring a current-frame image, and detecting whether the current-frame image has a focus frame triggered by a user; in response to the current-frame image having the focus frame, determining a target subject of the current-frame image based on an image in the focus frame; and in response to the current-frame image not having the focus frame, acquiring a tracking frame of a previous-frame image previous to the current-frame image, determining a first center weight map based on the tracking frame of the previous-frame image, and obtaining the target subject of the current-frame image by traversing the current-frame image based on the first center weight map; each of pixels of the first center weight map has a corresponding weight value, weight values of the pixels of the first center weight map are gradually reduced from a center to each edge thereof, and the tracking frame shows a region where the target subject is located in the previous-frame image.

An electronic device is provided in the embodiments of the present disclosure. The above-mentioned electronic device includes an image processing circuit. The image processing circuit may be implemented by hardware and/or software components, and may include various processing units defining an ISP (Image Signal Processing) pipeline. FIG. 1 is a schematic diagram of an image processing circuit according to some embodiments. In FIG. 1, for convenience of description, only various aspects of an image processing technology related to the embodiments of the present disclosure are shown.

In FIG. 1, the image processing circuit includes an ISP processor 140 and a control logic 150. Image data captured by an imaging device 110 is first processed by the ISP processor 140. The ISP processor 140 analyzes the image data to capture image statistics that may be used to determine one or more control parameters of the imaging device 110. The imaging device 110 may include a camera having an image sensor 114 and one lens 112 or more lenses 112. The image sensor 114 may include a color filter array (such as a Bayer filter), acquire light intensity and wavelength information captured by each of imaging pixels of the image sensor 114, and provide a set of raw image data that may be processed by the ISP processor 140. An attitude sensor 120 (such as a three-axis gyroscope, a Hall sensor, and an accelerometer) may provide collected image processing parameters (such as anti-shake parameters) to the ISP processor 140 based on an interface type of the attitude sensor 120. The interface of the attitude sensor 120 may use an SMIA (Standard Mobile Imaging Architecture) interface, other serial or parallel camera interfaces, or a combination of the above-mentioned interfaces.

In addition, the image sensor 114 may also send the raw image data to the attitude sensor 120. The attitude sensor 120 may provide the raw image data to the ISP processor 140 based on the interface type of the attitude sensor 120, or the attitude sensor 120 may store the raw image data into an image memory 130.

The ISP processor 140 processes the raw image data pixel by pixel in various formats. For example, each of image pixels may have a bit depth of 8, 10, 12, or 14 bits. The ISP processor 140 may perform one or more image processing operations for the raw image data, and collect statistical information about the image data. The image processing operations may be performed as the same bit depth accuracy or different bit depth accuracies.

The ISP processor 140 may also receive image data from the image memory 130. For example, the interface of the attitude sensor 120 sends the raw image data to the image memory 130. The raw image data in the image memory 130 is then provided to the ISP processor 140 to be processed. The image memory 130 may be a part of a memory device, a storage device, or an independent dedicated memory in an electronic device, and may include DMA (Direct Memory Access) features.

In response to receiving the raw image data from an interface of the image sensor 114 or from the interface of the attitude sensor 120 or from the image memory 130, the ISP processor 140 may perform one or more image processing operations, such as a temporal filtering. The processed image data may be sent to the image memory 130 for an additional process before being displayed. The ISP processor 140 receives the processed data from the image memory 130, and performs an image data process in an original region and an image data process in RGB and YCbCr color spaces on the processed data. The image data has been processed by the ISP processor 140 may be output to a display 160 for being viewed by a user and/or further processed by a graphics engine or a GPU (Graphics Processing Unit). In addition, an output data of the ISP processor 140 may also be sent to the image memory 130. The display 160 may read image data from the image memory 130. In an embodiment, the image memory 130 may be configured to implement one frame buffer or more frame buffers.

Statistical data determined by the ISP processor 140 may be sent to the control logic 150. For example, the statistical data may include statistical information of the image sensor 114 such as a vibration frequency of the gyroscope, automatic exposure, automatic white balance, automatic focus, flicker detection, black level compensation, and lens shadow correction. The control logic 150 may include a processor and/or a microcontroller executing one or more routines (such as a firmware). The one or more routines may determine the control parameters of the imaging device 110 and control parameters of the ISP processor 140 based on received statistical data. For example, the control parameters of the imaging device 110 may include control parameters of the attitude sensor 120 (such as gain, integration time of exposure control, anti-shake parameters, etc.), control parameters of camera flash, camera anti-shake displacement parameters, lens control parameters (such as focal length used for focusing or zooming), or a combination of these parameters. The ISP control parameters may include gain levels and color correction matrices used for automatic white balance and color adjustment (for example, during RGB processing), and lens shading correction parameters.

In an embodiment, a current-frame image is acquired by a lens 112 and the image sensor 114 in the imaging device 110 (a camera), and sent to the ISP processor 140. The ISP processor 140 is configured to detect whether the current-frame image has a focus frame triggered by a user, after the current-frame image is received. In response to detecting the current-frame image having the focus frame, the ISP processor 140 is further configured to determine a target subject of the current-frame image based on an image in the focus frame. In response to detecting the current-frame image not having the focus frame, the ISP processor 140 is further configured to acquire a tracking frame of a previous-frame image previous to the current-frame image, determine a first center weight map based on the tracking frame of the previous-frame image, and obtain the target subject of the current-frame image by traversing the current-frame image based on the first center weight map. Each of pixels of the first center weight map has a corresponding weight value, weight values of the pixels of the first center weight map are gradually reduced from a center to each edge thereof, such that a more accurate subject may be obtained and an accuracy of subject detection may be improved.

After the target subject is acquired, the ISP processor 140 is configured to send the target subject to the control logic 150. After the target subject is acquired, the control logic 150 may be configured to control the lens 112 in the imaging device 110 (a camera) to move to focus on a position corresponding to the target subject, such that a next-frame image having a clearer target subject may be obtained and sent to the ISP processor 140. After the next-frame image is received, the ISP processor 140 may be configured to take the current-frame image as a previous-frame image and take the next-frame image as the current-frame image, and detect whether the current-frame image has a focus frame triggered by a user. In response to the current-frame image having the focus frame, the ISP processor 140 is configured to determine the target subject of the current-frame image based on the image in the focus frame. In response to the current-frame image not having the focus frame, the ISP processor 140 is configured to acquire the tracking frame of the previous-frame image previous to the current-frame image, determine the first center weight map based on the tracking frame of the previous-frame image, and obtain the target subject of the current-frame image by traversing the current-frame image based on the first center weight map. In this way, a target video having a clearer target subject may be generated.

Figure 2:
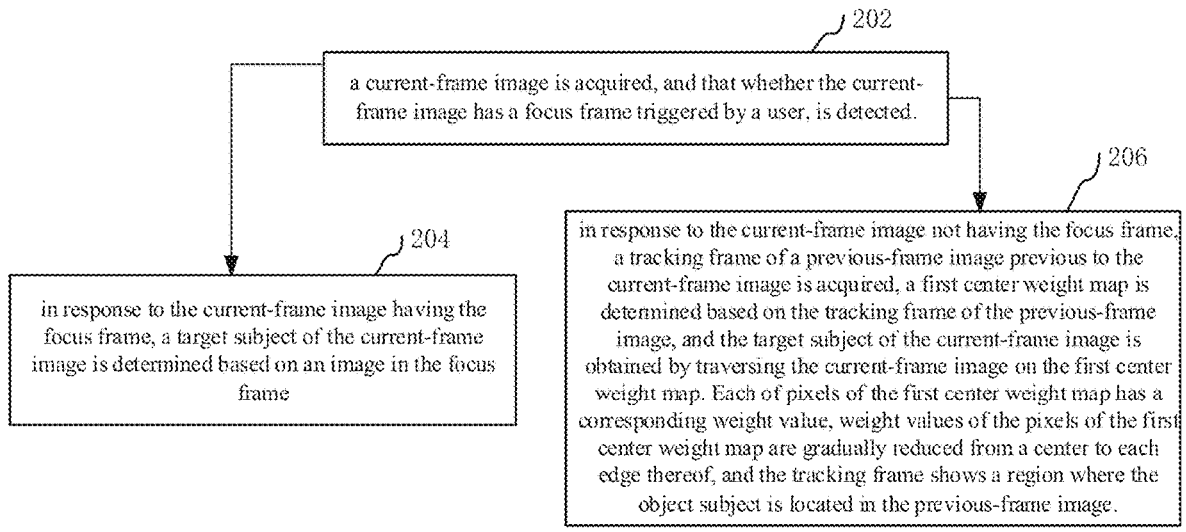
FIG. 2 is a flowchart of a subject detecting method according to some embodiments.

FIG. 2 is a flowchart of a subject detecting method according to some embodiments. In FIG. 2, the subject detecting method includes operations in the following.

In an operation 202, a current-frame image is acquired, and that whether the current-frame image has a focus frame triggered by a user, is detected.

The current-frame image refers to an image acquired at a current moment, may be any of a RGB (Red, Green, Blue) image, a grayscale image, a depth image, and an image corresponding to a Y component in a YUV image, and so on. The "Y" in the YUV image represents Luminance or Luma, which is a grayscale value. The "U" and "V" in the YUV represent Chrominance or Chroma, which is used to describe color and saturation of a video and specify a color of a pixel.

Specifically, an ISP processor or a central processing unit of the electronic device may acquire the current-frame image, and perform a filtering process for the current-frame image to remove noise. Then, the ISP processor or the central processing unit may detect whether the current-frame image has a focus frame. The focus frame is generated in response to a trigger instruction of the user. The focus frame shows a region where the target subject selected by the user is located.

In the present embodiment, the ISP processor or the central processing unit may be configured to detect whether the trigger instruction of the user is received on the current-frame image. In response to the trigger instruction of the user being received, a corresponding focus frame is generated at a trigger position of the user. Thus, the ISP processor or the central processor unit detects that the current-frame image has the focus frame. In response to the trigger instruction of the user being not received, it is indicated that the current-frame image does not have the focus frame triggered by a user.

In a preview mode of the electronic device shooting, the current-frame image is acquired. In order to reduce a calculation amount of subsequent processing, the current-frame image may be scaled to a relatively small size (such as 224*224, or other sizes).

In an operation 204, in response to the current-frame image having the focus frame, a target subject of the current-frame image is determined based on an image in the focus frame.

Specifically, in response to detecting the current-frame image having the focus frame triggered by a user, the ISP processor or the central processing unit may be configured to expand the focus frame, and crop an expanded focus frame to obtain an image in the expanded focus frame. The image in the expanded focus frame is input into a subject segmentation network, such that the target subject of the current-frame image may be obtained.

In an operation 206, in response to the current-frame image not having the focus frame, a tracking frame of a previous-frame image previous to the current-frame image is acquired, a first center weight map is determined based on the tracking frame of the previous-frame image, and the target subject of the current-frame image is obtained by traversing the current-frame image based on the first center weight map. Each of pixels of the first center weight map has a corresponding weight value, weight values of the pixels of the first center weight map are gradually reduced from a center to each edge thereof, and the tracking frame shows a region where the target subject is located in the previous-frame image.

The previous-frame image refers to an image adjacent to the current-frame image and acquired at a previous moment. The previous image may be any of a RGB (Red, Green, Blue) image, a grayscale image, a depth image, and an image corresponding to a Y component in a YUV image. The first center weight map refers to a map used to record the weight value of each of pixels of an image. The weight values of the first center weight map are gradually reduced from the center to each edge thereof, that is, the center has the largest weight, and the weights are gradually reduced toward four sides. The first center weight map is used to characterize that the weight values are gradually reduced from an image center pixel to an image edge pixel. The tracking frame shows the region where the target subject is located in the previous-frame image.

Specifically, in response to detecting the current-frame image not having the focus frame, the ISP processor or the central processing unit may be configured to obtain the previous-frame image previous to the current-frame image and further obtain the tracking frame of the previous-frame image, and generate a corresponding first center weight map based on a size of the tracking frame of the previous-frame image. Each of the pixels of the first center weight map has a corresponding weight value, and weight values of the pixels of the first center weight map are gradually reduced from a center to each edge thereof. The first center weight map may be generated by adopting a Gaussian function, or a first-order equation, or a second-order equation. The Gaussian function may be a two-dimensional Gaussian function.

Then, the ISP processor or the central processing unit is configured to obtain a plurality of subject regions by traversing the current-frame image, and the region where the target subject is located may be determined from the plurality of subject regions. The region where the subject is located is obtained and input into the subject segmentation network, and the target subject of the current-frame image may be obtained.

In the present disclosure, both the current-frame image and the previous-frame image may be obtained by the electronic device shooting. The electronic device may be provided with a camera. The number of the camera may be one or more, for example, 1, 2, 3, 5, etc., which is not limited here. A form that the camera is arranged in the electronic device is not limited. For example, the camera may be a camera arranged inside the electronic device, or arranged external to the electronic device. The camera may be a front camera or a rear camera.

The current-frame image and the previous-frame image may be captured by the same camera in the electronic device, or by different cameras, which is not limited thereto. The camera on the electronic device may be any type of camera. For example, the camera may be a color camera, a grayscale image, a black and white camera, a depth camera, a telephoto camera, a wide-angle camera, etc., which is not limited thereto.

Correspondingly, a color image, that is, an RGB image, is acquired through a color camera, a grayscale image is acquired through a black and white camera, a depth image is acquired through a depth camera, a telephoto image is acquired through a telephoto camera, and a wide-angle image is acquired through a wide-angle camera, which is not limited thereto. The cameras in the electronic device may be the same type or different types. For example, all the cameras may be color cameras, or black and white cameras, or one of the cameras may be a telephoto camera and other cameras may be a wide-angle camera, which it is not limited thereto.

Specifically, the electronic device may be configured to store each of captured images in a first-in-first-out queue based on a sequence order of camera shooting time, and further obtain the current-frame image and the previous-frame image from the first-in-first-out queue.

The first-in-first-out queue refers to the images stored first being taken out first. The previous-frame image is first obtained by the electronic device from the first-in-first-out queue, and then the current-frame image is obtained by the electronic device from the first-in-first-out queue.

In another embodiment, a current shooting moment and a previous shooting moment are obtained. The current-frame image is obtained based on the current shooting moment. The previous-frame image is obtained based on the previous shooting moment.

In response to the current shooting moment being obtained by the electronic device, a shooting frequency may be obtained. The previous shooting moment may be obtained based on the current shooting moment and the shooting frequency. For example, the current shooting moment is 15:45:56.200 and the shooting frequency is 10 frames/s, that is, one frame of image is taken every 100 ms, thus the previous shooting moment is 15:45:56.100. The current-frame image is obtained based on the current shooting moment. The previous-frame image is obtained based on the previous shooting moment.

In an embodiment, a down-sampled process may be performed for the current-frame image and the previous-frame image, and a current-frame image having a smaller size and a previous-frame image having a smaller size may be obtained, so as to save a calculation amount of computer processing.

In an embodiment, a filtering process may be performed for the current-frame image and the previous-frame image, such that a high frequency noise carried by a complex background including a lot of texture details, of the current-frame image and the previous-frame image, may be filtered out, or a high frequency noise caused by an image down-sampled process may be filtered out. In this way, a more accurate current-frame image and a more accurate previous-frame image may be obtained, and an occurrence of a false detection of a subject detection may be reduced. In some embodiments, the filtering process may be at least one of a Gaussian filtering process, a smoothing filtering process, a bilateral filtering process, and the like. The down-sampled process refers to sampling once at intervals of several pixels of the image to obtain a new image.

The subject detecting method in the present embodiment includes the following. The current-frame image is acquired, and that whether the current-frame image has a focus frame triggered by the user, is detected. In response to the current-frame image having the focus frame, the target subject of the current-frame image is determined based on the image in the focus frame. The target subject may be determined quickly and simply. In response to the current-frame image not having the focus frame, the tracking frame of a previous-frame image previous to the current-frame image is acquired, the first center weight map is determined based on the tracking frame of the previous-frame image, and the target subject of the current-frame image is obtained by traversing the current-frame image based on the first center weight map. Each of pixels of the first center weight map has a corresponding weight value, weight values of the pixels of the first center weight map are gradually reduced from a center to each edge thereof. In this way, the target subject in the current-frame image may be identified more accurately.

Figure 3:
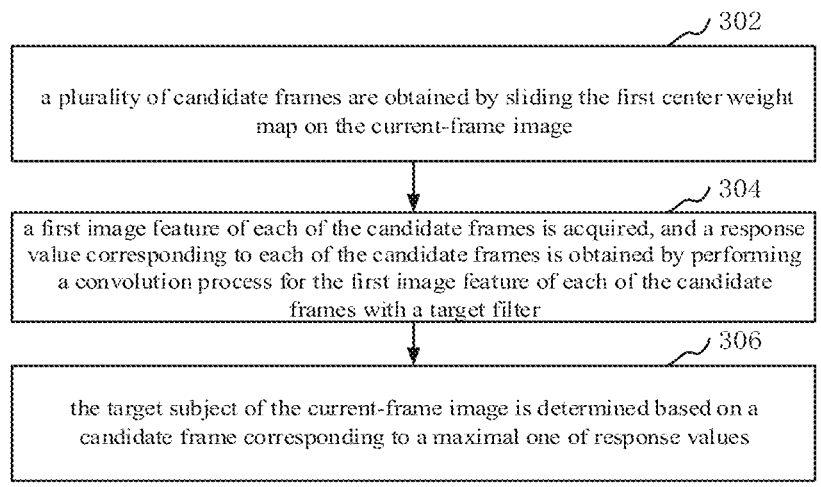
FIG. 3 is an operation flowchart of obtaining a target subject of a current-frame image based on a first center weight map according to some embodiments.

In an embodiment, in FIG. 3, the operating of the target subject of the current-frame image being obtained by traversing the current-frame image based on the first center weight map, includes operations in the following.

In an operation 302, a plurality of candidate frames are obtained by sliding the first center weight map on the current-frame image.

The candidate frames are image regions in the current-frame image where the target subject may exist.

Specifically, the ISP operator or the central operate unit are configured to control the first center weight map to be slid in the current-frame image. Each time the first center weight map is controlled to be slid, a candidate frame may be obtained. A size of the candidate frame is the same with that of the first center weight map. A plurality of candidate frames may be obtained in response to the current-frame image being traversed using the first center weight map.

In an operation 304, a first image feature of each of the candidate frames is acquired, and a response value corresponding to each of the candidate frames is obtained by performing a convolution process for the first image feature of each of the candidate frames with a target filter.

The target filter refers to a trained filter. Further, the target filter refers to a filter obtained by an updating process being performed based on the subject region of the previous-frame image. The response value may be a regression response value. The first image feature refers to an image feature obtained by the point multiplication process.

Specifically, the ISP processor or the central processing unit is configured to obtain the target filter, and obtain the first image feature corresponding to each of the candidate frames. The response value corresponding to each of the candidate frames is obtained by performing the convolution process for the first image feature of each of the candidate frames with the target filter.

In the present embodiment, in response to a first candidate frame being obtained by sliding the first center weight map on the current-frame image, the first image feature of the first candidate frame is obtained. A response value corresponding to the first candidate frame is obtained by performing the convolution process for the first image feature with the target filter. By an analogy, each time a candidate frame is obtained, the convolution process is performed for the first image feature of the candidate frame with the target filter, and a corresponding response value is obtained. In this way, in response to the current-frame image being traversed by the first center weight map, a response value corresponding to a last candidate frame may be obtained, thus efficiency of the convolution process may be improved.

In an operation 306, the target subject of the current-frame image is determined based on a candidate frame corresponding to a maximal one of response values.

Specifically, the ISP processor or the central processing unit is configured to acquire the response value corresponding to each of the candidate frames, and determine the maximal one of response values. The ISP processor or the central processing unit is further configured to obtain the candidate frame corresponding to the maximal one of the response values, expand the candidate frame, crop the expanded candidate frame, and obtain a subject region in the candidate frame. The ISP processor or the central processing unit is configured to input the subject region of the candidate frame into the subject segmentation network, and obtain the target subject of the current-frame image.

In the present embodiment, each of the candidate frames is obtained by traversing the current current-frame image through the first center weight map. The first image feature of each of the candidate frames is obtained. The response value corresponding to each of the candidate frames is obtained by performing a convolution process for the first image feature of each of the candidate frames with the target filter. The target subject of the current-frame image is determined based on the maximal one of the response values. The candidate frame corresponding to the maximal one of the response values is most likely to have the target subject, such that the target subject in the image may be identified accurately.

In an embodiment, the operating of the first image feature in each of the candidate frames being acquired, includes: a second image feature of each of the candidate frames being acquired, the second image feature including pixel values of pixels of each of the candidate frames obtained by sliding the first center weight map on the current-frame image, and a point multiplication process is performed for a pixel value of each of the pixels of each of the candidate frames with a weight value of a corresponding pixel of the first center weight map, and the first image feature of each of the candidate frames is obtained.

Specifically, the ISP processor or the central processing unit is configured to control the first central weight map to be slid on the current-frame image. Each time the first central weight map is controlled to be slid, a candidate frame may be obtained. The image feature in the candidate frame may also be obtained, that is, the second image feature may be obtained. A size of each of the second image features is the same as a size of the first center weight map. The second image feature includes the pixel values of the pixels of each of the candidate frames obtained by the first center weight map being slid on the current-frame image. Each time a second image feature is obtained, the point multiplication process is performed for a pixel value of each of pixels composing the second image feature with a weight value of a corresponding pixel of the first center weight map, and the first image feature of the candidate frame is obtained. The first image feature of the candidate frame is obtained by the second image feature being performed the point multiplication process. A size of the candidate frame is the same with the size of the first center weight map.

In the present embodiment, the second image feature of each of the candidate frames is acquired. The second image feature includes the pixel values of the pixels of each of the candidate frames obtained by the first center weight map being slid on the current-frame image. The point multiplication process is performed for the pixel value of each of the pixels of each of the candidate frames with the weight value of the corresponding pixel of the first center weight map, and the first image feature of each of the candidate frames is obtained. In this way, a center region of the image may be highlighted, and the target subject may be identified more easily.

In an embodiment, the operating of the point multiplication process being performed for the pixel value of each of the pixels of each of the candidate frames with the weight value of the corresponding pixel of the first center weight map, includes a logarithm operation process being performed for the pixel value of each of the pixels of each of the candidate frames, and the point multiplication process being performed for the pixel value of each of the pixels of each of the candidate frames, which has been processed by the logarithm operation process, with the weight value of the corresponding pixel of the first center weight map.

The logarithmic operation process refers to a pixel value of a pixel being taken the logarithm of.

Specifically, the ISP processor or the central processing unit is configured to control the first center weight map to be slid on the current-frame image. Each time the first center weight map is controlled to be slid, the second image feature of the candidate frame may be obtained. The pixel value of each of the pixels composing the second image feature is determined. The logarithm operation process is performed for the pixel value of each of the pixels, that is, the pixel value of each of the pixels is taken a logarithm of. Then, the point multiplication process is performed for the logarithm of the pixel value of each of pixels of the candidate frame with the weight value of the corresponding pixel of the first center weight map, and an image feature of the candidate frame, which has been processed by the point multiplication process, is obtained. That is, the first image feature is obtained. It can be understood that each of the pixels of the candidate frame corresponds to each of pixels of the first center weight map one-to-one.

Similarly, each time of sliding, pixels of a candidate frame may be obtained, and a pixel value corresponding to each of the pixels may be also obtained. The same process as described above is performed for each of the candidate frames and obtaining the first image feature of each of the candidate frames.

In the present embodiment, after the pixel value of each of pixels of the candidate frame being acquired, a normalization process may be performed for the pixel value of each of pixels to reduce the calculation amount. The logarithm operation process is performed for the pixel value of each of the pixels, which has been processed by the normalization process.

In the present embodiment, the pixel value which has been processed by the logarithmic operation process may be normalized.

In the present embodiment, the logarithm operation process is performed for the pixel value of each of pixels of the candidate frame, such that interference of a contrast region on target tracking may be reduced. The point multiplication process is performed for the pixel value of each of the pixels of the image in the focus frame, which has been processed by the logarithm operation process, with the weight value of the corresponding pixel of the first center weight map, such that the center region of the image may be highlighted, and the target subject may be identified more easily.

In an embodiment, the operating of determining the target subject of the current-frame image based on the candidate frame corresponding to the maximal one of the response values, includes the candidate frame corresponding to the maximal one of the response values being taken as a first subject region of the current-frame image, the first subject region of the current-frame image being input into a subject segmentation network, and the target subject of the current-frame image is obtained.

Specifically, the ISP processor or the central processing unit may be configured to determine the maximal one of the response values, and determine the candidate frame corresponding to the maximal one of the response values. An image in the candidate frame corresponding to the maximal one of the response values is taken as the first subject region of the current-frame image. The first subject region is cropped out from the current-frame image. The cropped first subject region is enlarged to a preset size. The first subject region that is enlarged to the preset size is input into the subject segmentation network, and the target subject in the current-frame image is obtained.

In the present embodiment, the ISP processor or the central processing unit may be configured to obtain a subject segmentation image of the previous-frame image. The subject segmentation image may be a binarization image of subject segmentation. The subject segmentation image of the previous-frame image and the first subject region with the preset size are input into the subject segmentation network, and the target subject of the current-frame image is obtained. By adding the subject segmentation image of the previous-frame image into the subject segmentation network, subject position information of the previous-frame image is added, such that the accuracy of the subject detection may be improved.

In the present embodiment, the candidate frame corresponding to the maximal one of the response values is taken as the first subject region of the current-frame image, the first subject region of the current-frame image is input into the subject segmentation network and obtaining the target subject of the current-frame image. The region where the target subject is located may be determined by the response values, and the region containing the target subject may be input into the subject segmentation network so as to quickly detect the target subject of the current-frame image.

Figure 4:
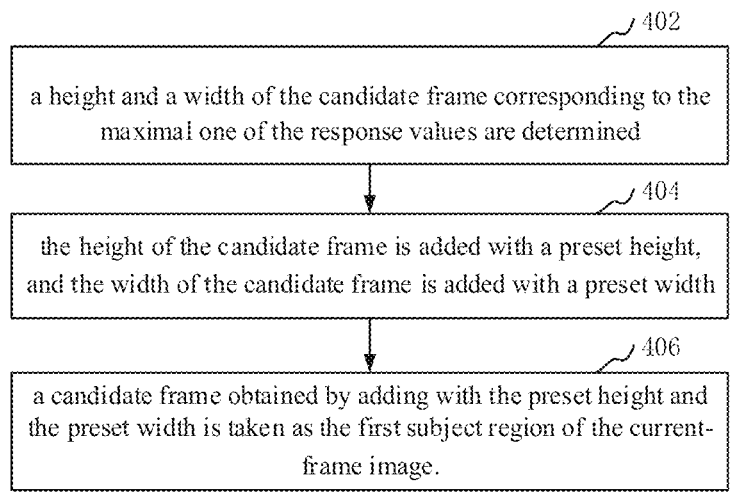
FIG. 4 is an operation flowchart of taking a candidate frame corresponding to the maximal one of response values as a first subject region of the current-frame image.

In an embodiment, in FIG. 4, the operating of the candidate frame corresponding to the maximal one of the response values being taken as the first subject region of the current-frame image, includes operations in the following.

In an operation 402, a height and a width of the candidate frame corresponding to the maximal one of the response values are determined.

Specifically, the ISP processor or the central processing unit may be configured to determine the maximal one of the response values, determine the candidate frame corresponding to the maximal one of the response values, and then determine the height and the width of the candidate frame.

In an operation 404, the height of the candidate frame is added with a preset height, and the width of the candidate frame is added with a preset width.

The preset height refers to any one of a height value and a height ratio that are preset. The preset width refers to any one of a width value and a width ratio that are preset.

Specifically, the ISP processor or the central processing unit is configured to acquire the preset height value, add the height value of the candidate frame with the preset height value, acquire the preset width value, and add the width value of the candidate frame with the preset width value. In this way, a candidate frame added with the preset height value and the preset width value is obtained.

In the present embodiment, the ISP processor of the electronic device may be configured to acquire a preset height ratio, add the height value of the candidate frame of the current-frame image with the preset height ratio, acquire a preset width ratio, and add the weight value of the candidate frame of the current-frame image with the preset weight ratio. In this way, a candidate added with the preset height ratio and the preset width ratio is obtained.

For example, the height of the candidate frame corresponding to the maximal one of the response values is h, and the width of the candidate frame corresponding to the maximal one of the response values is w. The height of the candidate frame is increased by h/4, and the width of the candidate frame is increased by w/4. A position of the candidate frame after being expanded is recorded as a first subject region position of the current-frame image.

In an operation 406, a candidate frame obtained by adding with the preset height and the preset width is taken as the first subject region of the current-frame image.

Specifically, the ISP processor or the central processing unit of the electronic device are configured to take the candidate frame obtained by adding with the preset height and the preset width as the first subject region of the current-frame image.

In the present embodiment, the ISP processor or the central processing unit of the electronic device may be configured to take the candidate frame obtained by adding with the preset height ratio and the preset width ratio as the first subject region of the current-frame image.

It can be understood that, in response to the current-frame image adding with the height and the width of the candidate frame, the image feature of the candidate frame is also increased correspondingly.

The subject detecting method in the present embodiment, the height and the width of the candidate frame corresponding to the maximal one of the response values are determined. The height of the candidate frame is added with the preset height, and the width of the candidate frame is added with the preset width. The candidate frame obtained by adding with the preset height and the preset width is taken as the first subject region of the current-frame image, such that a complete region where the target subject is located may be determined accurately, and a possibility of a part absence of the detected target subject as a result of the candidate frame being too small may be reduced.

In an embodiment, the subject region of the current-frame image may be determined by KCF (Kernel Correlation Filter) algorithm, MedianFlow bidirectional optical flow tracking algorithm, etc.

Figure 5:
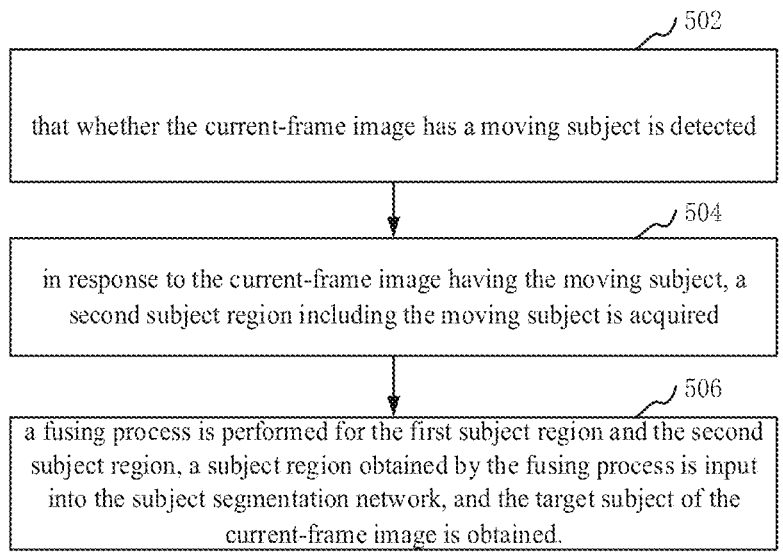
FIG. 5 is a flowchart of obtaining the target subject of the current-frame image according to some embodiments.

In an embodiment, in FIG. 5, the operating of the first subject region of the current-frame image being input into the subject segmentation network, and the target subject of the current-frame image being obtained, includes operations in the following.

In an operation 502, that whether the current-frame image has a moving subject is detected.

The moving subject refers to a subject in a moving state.

Specifically, the ISP processor or the central processing unit is configured to perform a background subtraction process for the current-frame image and obtain a binary image corresponding to the current-frame image. Then, a connected component process is performed for the binary image and obtain an area size of each of candidate subjects in the binary image. In response to any one of the area size of each of the candidate subjects being larger than or equal to an area threshold, that the current-frame image has the moving subject is determined. In response to all the area size of each of the candidate subjects being less than the area threshold, that the current-frame image does not have the moving subject is determined.

The connected component generally refers to an image region composed of adjacent foreground pixels having the same pixel value in an image. The foreground pixels refer to subject pixels. The connected component process refers to finding and marking each of the connected components in the image.

Specifically, the ISP processor or the central processing unit of the electronic device may be configured to detect and mark each of the connected components in the binary image. Each of the connected components may be taken as a candidate subject. The area size of each of the candidate subjects in the binary image is determined.

It can be understood that the larger the area size of the candidate subject, it means that the closer the candidate subject is to the camera. The subject closer to the camera is the subject that the user wants to photograph. Therefore, in response to all the area size of each of the candidate subjects being less than the area threshold, it is indicated that the area size of each of the candidate subjects in the current-frame image is small. It may be considered that each of the candidate subjects is not the moving subject, nor is it the subject that the user wants to photograph.

In response to any one of the area size of each of the candidate subjects being larger than or equal to an area threshold, it may be considered that a candidate subject whose area size is larger than or equal to the area threshold is the moving subject, and is also the subject that the user wants to paragraph. In response to all the area size of each of the candidate subjects being less than the area threshold, it is determined that the current-frame image does not have the moving subject.

In another embodiment, that whether the current-frame image has the moving subject may be determined based on a sharpness of a contour edge of each of the candidate subjects. Understandably, in response to the image having the moving subject, the contour edge of the moving subject of a captured image will be blurred to a certain extent. Therefore, the sharpness of the contour edge of each of the candidate subjects may be obtained. In response to the sharpness of the contour edge being greater than a sharpness threshold, it may be considered that the candidate subject is a stationary object, that is, there is no moving subject. In response to the sharpness of the contour edge being less than or equal to the sharpness threshold, it may be considered that the candidate subject is the moving subject.

In other embodiments, feature points of each of the candidate subjects may be extracted, feature descriptors of each of the feature points may be generated. That whether each of the candidate subjects has the moving subject may be determined based on each of the feature descriptors.

In the present disclosure, manners to determine whether each of the candidate subjects has the moving subject may be but are not limited to the above methods.

In an operation 504, in response to the current-frame image having the moving subject, a second subject region including the moving subject is acquired.

The second subject region may be a rectangular region containing the moving main body, may also be a circular region containing the moving main body, or may be an irregularly shaped region containing the moving main body, which is not limited thereto.

Specifically, in response to the ISP processor or the central processing unit of the electronic device detecting the current-frame image has the moving subject exists therein based on the binary image, the second subject region containing the moving subject in the current-frame image may be acquired.

In an operation 506, a fusing process is performed for the first subject region and the second subject region, and a subject region obtained by the fusing process is input into the subject segmentation network, and the target subject of the current-frame image is obtained.

The subject segmentation image may be the same as the candidate subject before input, or may be different from the candidate subject before input. The fusing process may be an AND process. The AND process refers to a logical operation. For example, the AND process is performed for 0 and 1, and 0 is obtained. The AND process is performed for 1 and 0, and 0 is obtained. The AND process is performed for 1 and 1, and 1 can be obtained.

Specifically, the ISP processor or the central processing unit is configured to perform the AND process for the first subject region and the second subject region. The AND process may be performed for the value of the pixel of the first subject region and the value of the corresponding pixel of the second subject region, and the fused subject region is obtained. Subsequently, the subject region obtained by the fusing process is input into the subject segmentation network, and the target subject in the current-frame image is obtained.

In the present embodiment, that whether the current-frame image has the moving subject is determined. In response to the current-frame image having the moving subject, the second subject region containing the moving subject is acquired, the fusing process is performed for the first subject region and the second subject region, the subject region obtained by the fusing process is input into the subject segmentation network, and the target subject in the current-frame image is obtained. In this way, a more accurate target subject may be obtained.

In an embodiment, after the target subject of the current-frame image being obtained, the method further includes the target filter being updated based on the first subject region of the current-frame image.

Specifically, the ISP processor or the central processing unit is configured to obtain the first subject region of the current-frame image, input the first subject region into the target filter, train the target filter based on the first subject region of the current-frame image, such that an update of the target filter may be achieved. The filter is updated based on the first subject region of the current-frame image, such that interference to the subject detection in aspect of illumination, posture, scale, and so on, may be reduced.

In an embodiment, the first subject region and the target filter may be transformed from a time domain to a frequency domain, and a time domain convolution operation may be transformed to a frequency domain product operation, so as to reduce the calculation amount of the convolution.

Figure 6:
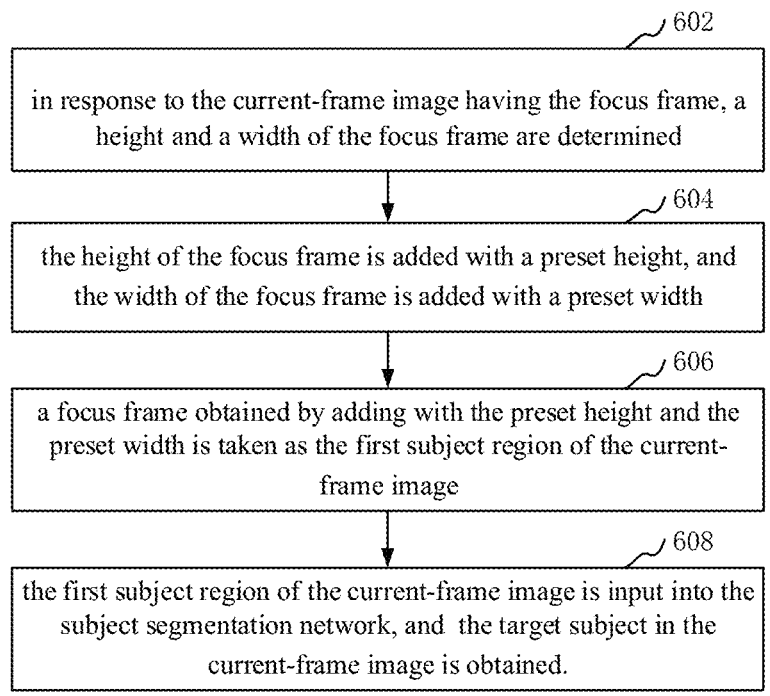
FIG. 6 is an operation flowchart of determining the target subject of the current-frame image based on an image in the focus frame according to some embodiments.

In an embodiment, in FIG. 6, the operating of the target subject of the current-frame image being determined based on the image in the focus frame, in response to the current-frame image having the focus frame, includes operations in the following.

In an operation 602, in response to the current-frame image having the focus frame, a height and a width of the focus frame are determined.

Specifically, in response to the ISP processor or the central processing unit detecting the current-frame image having the focus frame triggered by the user, the height and the width of the focus frame may be obtained.

In an operation 604, the height of the focus frame is added with a preset height, and the width of the focus frame is added with a preset width.

Specifically, the ISP processor or the central processing unit is configured to acquire the preset height, and add the height of the focus frame with the preset height; acquire the preset width, and add the width of the focus frame with the preset width, such that a focus frame adding with the preset height and the preset width is obtained.

In the present embodiment, the ISP processor of the electronic device may be configured to acquire a preset height ratio, and add the height of the focus frame of the current-frame image with the preset height ratio; acquire a preset width ratio, and add the width of the focus frame of the current-frame image with the preset width ratio, such that a candidate adding with the preset height ratio and the preset width ratio is obtained.

For example, the height of the focus frame corresponding to the maximal one of the response values is h, the width of the focus frame corresponding to the maximal one of the response values is w. The height of the focus frame is added with h/4, the width of the focus frame is added with w/4. A position of the focus frame after being expanded is recorded as the first subject region position of the current-frame image.

In an operation 606, a focus frame obtained by adding with the preset height and the preset width is taken as the first subject region of the current-frame image.

Specifically, the ISP processor or the central processing unit may be configured to take the focus frame obtained by adding with the preset height and the preset width as the first subject region of the current-frame image.

In the present embodiment, the ISP processor or the central processing unit is configured to take the focus frame obtained by adding with the preset height ratio and the preset width ratio as the first subject region of the current-frame image.

Understandably, in response to the current-frame image adding with the height and the width of the focus frame, the image feature in the focus frame is also be increased correspondingly.

Understandably, the preset height and the preset width added to the focus frame may be same with the preset height and the preset width added to the candidate frame, or may be different from the preset height and the preset width added to the candidate frame.

In an operation 608, the first subject region of the current-frame image is input into the subject segmentation network, and the target subject in the current-frame image is obtained.

The first subject region is cropped from the current-frame image, and the cropped first subject region is enlarged to a preset size. Then, the first subject region that is enlarged to the preset size is input into the subject segmentation network, and the target subject of the current-frame image is obtained.

In the present embodiment, the ISP processor or the central processing unit may be configured to acquire a subject segmentation image of the previous-frame image. The subject segmentation image may be a binarization image containing the target subject, output after the subject region of the previous-frame image passes through the subject segmentation network. The subject segmentation image of the previous-frame image and the first subject region with the preset size are input into the subject segmentation network and obtaining the target subject in the current-frame image. By adding the subject segmentation image of the previous-frame image into the subject segmentation network, subject position information of the previous-frame image is added, such that the accuracy of the subject detection may be improved.

The subject detecting method in the present embodiment, in response to the current-frame image having the focus frame, the height and the width of the focus frame are determined. The height of the focus frame is added with the preset height, and the width of the focus frame is added with the preset width. The focus frame obtained by adding with the preset height and the preset width is taken as the first subject region of the current-frame image, such that a complete region where the target subject is located may be determined accurately, and a possibility of a part absence of the detected target subject as a result of the target subject moving but a size of the focus frame not being changed may be reduced.

In an embodiment, the operating of the first subject region of the current-frame image being input into the subject segmentation network, and the target subject of the current-frame image being obtained, includes the subject segmentation image of the previous-frame image being acquired, the subject segmentation image of the previous-frame image and the first subject region of the current-frame image being input into the subject segmentation network, and the target subject of the current-frame image being obtained.

Figure 7:
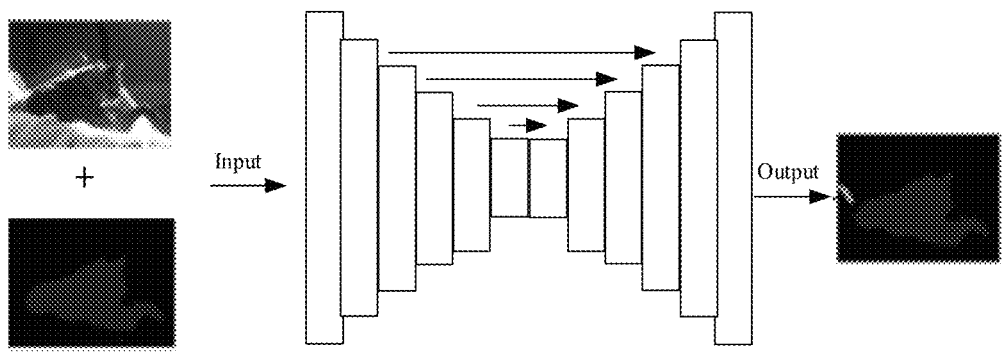
FIG. 7 is a schematic diagram of detecting the target subject through a subject segmentation network according to some embodiments.

Specifically, the subject segmentation network may be network architectures such as deeplab v3+, U-Net and so on. In FIG. 7, the ISP processor or the central processing unit may acquire the subject segmentation image of the previous-frame image, and input the subject segmentation image of the previous-frame image and the first subject region of the current-frame image into the subject segmentation network. The binary image of the first subject region may be output after a multi-layer convolution, so as to obtain the target subject in the current-frame image. A traditional network input is an RGB three-channel image to perform a network segmentation prediction. In the present embodiment, a channel is added into the subject segmentation network, that is, the subject segmentation binary image of the previous-frame image. The subject position information of the previous-frame image is brought into the network through the subject segmentation binary image, such that a segmentation effect of the network in a video scene may be improved.

In an embodiment, the operating of the first subject region of the current-frame image being input into the subject segmentation network, and the target subject of the current-frame image being obtained, includes the subject segmentation image of the previous-frame image being acquired, the subject segmentation image of the previous-frame image and the first subject region of the current-frame image being input into the subject segmentation network, a subject segmentation image of the current-frame image being obtained, and a proportion of the subject segmentation image of the current-frame image relative to the current-frame image being determined; and in response to the proportion of the subject segmentation image of the current-frame image relative to the current-frame image being less than a proportion threshold, the current-frame image being input into the subject segmentation network, and the target subject of the current-frame image being obtained.

Specifically, the ISP processor or the central processing unit is configured to input the subject segmentation image of the previous-frame image and the first subject region of the current-frame image into the subject segmentation network. The binary image of the first subject region may be output after the multi-layer convolution, which is the subject segmentation image of the current-frame image. The proportion of the subject segmentation image of the current-frame image relative to the current-frame image is calculated. The proportion threshold is acquired. That whether the calculated proportion of the subject segmentation image relative to the current-frame image is greater than the proportion threshold is determined. In response to the proportion of the subject segmentation image relative to the current-frame image being less than the proportion threshold, it is indicated that the target subject has been left a current screen. That is, the subject segmentation image does not have the target subject, or only have a part of the target subject, the target subject is not complete, and the target subject in the current-frame image is needed to be re-detected. The current-frame image is input into the subject segmentation network, and the target subject in the current-frame image is obtained.

In the present embodiment, the subject segmentation image of the previous-frame image may be acquired, the subject segmentation image of the previous-frame image and the current-frame image are input into the subject segmentation network, and the target subject in the current-frame image is obtained.

In the present embodiment, the subject segmentation image of the previous-frame image may be acquired, the subject segmentation image of the previous-frame image and the first subject region of the current-frame image may be input into the subject segmentation network, the subject segmentation image of the current-frame image is obtained. The proportion of the subject segmentation image of the current-frame image relative to the current-frame image may be determined. That whether there is the target subject in a current detection result and whether the detected target subject is complete may be determined based on whether the proportion is greater than the proportion threshold. In response to the proportion of the subject segmentation image of the current-frame image relative to the current-frame image being less than the proportion threshold, it is indicated that the detection is not accurate and the target subject is not complete. Then, the current-frame image is input into the subject segmentation network, so as to obtain the target subject in the current-frame image.

Figure 8:
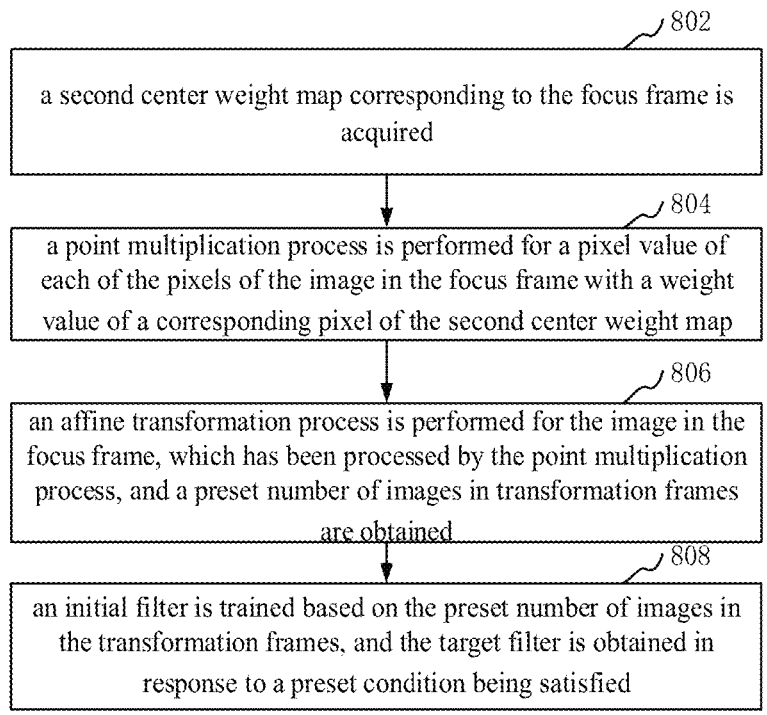
FIG. 8 is an operation flowchart of generating a target filter according to some embodiments.

In an embodiment, in FIG. 8, a generating manner of the target filter is obtained by a manner, which includes operations in the following.

In an operation 802, a second center weight map corresponding to the focus frame is acquired, each of pixels of the second center weight map having a corresponding weight value, and weight values of the pixels of the second center weight map being gradually reduced from a center to each edge thereof.

The second center weight map refers to a map used to record the weight value of each of pixels of an image. The weight values of the second center weight map are gradually reduced from the center to each edge thereof, that is, the center has the largest weight, and the weights are gradually reduced toward four sides. The second center weight map is used to characterize that the weight values are gradually reduced from an image center pixel to an image edge pixel. The second center weight map may be the same with the first center weight map, or may be different from the first center weight map. That is, a size of the second center weight map may be the same with the size of the first center weight map, or the size of the second center weight map may be different from the size of the first center weight map, which will be set according to specific conditions.

Specifically, the ISP processor or the central processing unit may be configured to generate a corresponding second center weight map based on a size of the image in the focus frame. The second center weight map may be generated by adopting the Gaussian function, or the first-order equation, or the second-order equation. The Gaussian function may be the two-dimensional Gaussian function.

In the present embodiment, in response to the size of the focus frame being the same with a size of the tracking frame of the previous-frame image, the first center weight map may be directly acquired to be a center weight map corresponding to the focus frame.

In an operation 804, a point multiplication process is performed for a pixel value of each of the pixels of the image in the focus frame with a weight value of a corresponding pixel of the second center weight map.

Specifically, the ISP processor or the central processing unit may be configured to acquire each of the pixels of the image in the focus frame and the pixel value of each of the pixels, and match each of the pixels of the focus frame with each of the pixels of the second center weight map. Subsequently, the point multiplication process is performed for the pixel value of the successfully matched pixel of the focus frame with the weight value of a corresponding pixel of the second center weight map.

In an operation 806, an affine transformation process is performed for the image in the focus frame, which has been processed by the point multiplication process, and a preset number of images in transformation frames are obtained.

The affine transformation is a linear transformation from two-dimensional coordinates to two-dimensional coordinates, maintaining "flatness" of a two-dimensional graphic (that is, a straight line will still be a straight line and not be bended, and an arc will still be an arc) and "parallelism" (that is, to ensure that a relative position relationship between the two-dimensional graphics remains unchanged, a parallel line is still a parallel line, and an angle of intersection of intersecting straight lines remains unchanged). Briefly, the affine transformation is that the graphics are allowed to tilt arbitrarily, and to be arbitrarily stretched and transformed in two directions. In addition, a relationship that lines have the same points and a relationship that points share the same line, of the graphics are kept unchanged. The lines that were originally substantially parallel to each other are still substantially parallel to each other, an original midpoint is still the midpoint, and a proportional relationship between straight line segments remains unchanged. However, lengths of the line segments may be changed, and an angle of the angle of intersection may be changed.

Specifically, after the point multiplication process for the image in the focus frame and the successfully matched pixels of the second center weight map is completed, the ISP processor or the central processing unit is configured to perform the affine transformation process for the image in the focus frame, which has been processed by the point multiplication process, and obtain the preset number of images in the transformation frames.

In the present embodiment, the affine transformation may be implemented by a combination of a series of atomic transformations, including but not limited to manners such as translation, scale, flip, rotation, and shear and so on.

An operation 808, an initial filter is trained based on the preset number of images in the transformation frames, and the target filter is obtained in response to a preset condition being satisfied.

The initial filter refers to a filter to be trained.

Specifically, the ISP processor or the central processing unit is configured to obtain a response value corresponding to each of the transformation frames by performing a convolution process for the images in the preset number of the transformation frames with the initial filter. The target subject of the current-frame image may be obtained based on an image in a transformation frame corresponding to a maximal response value. Subsequently, a marked target subject of the focus frame may be obtained. The marked target subject of the focus frame is compared to the target subject obtained based on the image in the transformation frame corresponding to the maximal response value, and parameters of the initial filter are adjusted based on difference between the two. A training is performed again until the difference between the two is less than a difference threshold, in which time the training is stopped. The parameters of the filter at this time are determined so as to obtain the target filter. Therefore, the preset condition may be that the difference between the target subjects obtained based on the image in the transformation frame corresponding to the maximal response value and the marked target subject of the focus frame is less than the difference threshold.

In the present embodiment, the second center weight map corresponding to the focus frame is acquired. Each of the pixels of the second center weight map has the corresponding weight value, and the weight values of the second center weight map are gradually reduced from the center to each edge thereof. The point multiplication process is performed for the image in the focus frame and the second center weight map. The affine transformation process is performed for the image in the focus frame, which has been processed by the point multiplication process, and a preset number of images in transformation frames are obtained. The initial filter is trained based on the preset number of images in the transformation frames. In response to the preset condition being satisfied, the target filter may be obtained, so as to obtain the trained target filter.

Figure 9:
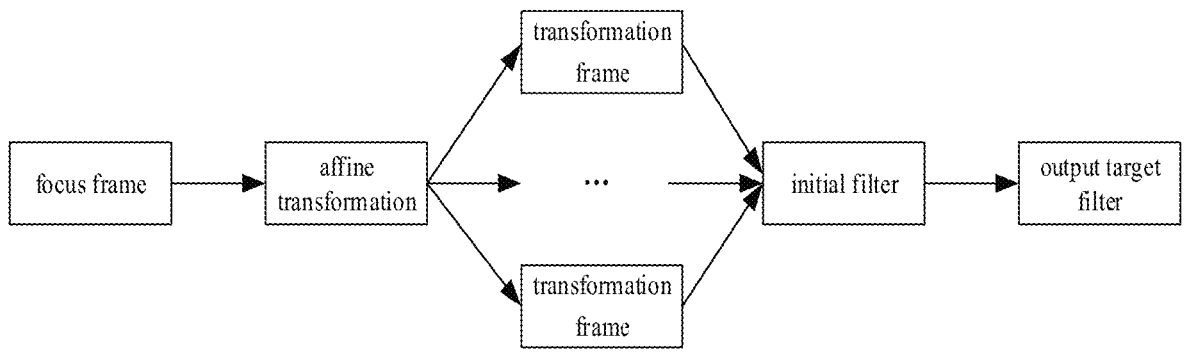
FIG. 9 is a schematic diagram of generating the target filter according to other some embodiments.

In FIG. 9, FIG. 9 is a schematic diagram of generating the target filter according to other some embodiments. The image in the focus image is acquired. The affine transformation process is performed for the focus frame and the image in the focus frame, and a plurality of transformation frames are obtained. The initial filter is trained based on the images in the plurality of the transformation frames. In response to the preset condition being satisfied, the target filter is obtained.

In an embodiment, the operating of the point multiplication process being performed for the image in the focus frame with the second center weight map, includes a logarithm operation process being performed for the pixel value of each of the pixels of the image in the focus frame, and the point multiplication process being performed for the pixel value of each of the pixels of the image in the focus frame, which has been processed by the logarithm operation process, with the weight value of the corresponding pixel of the second center weight map.

Specifically, the ISP operator and the central processing unit may be configured to acquire the pixel value of each of the pixels of the image in the focus frame, perform the logarithm operation process for the pixel value of each of the pixels, that is, the pixel value of each of the pixels is taken a logarithm of. Subsequently, the point multiplication process is performed for the logarithm of the pixel value of each of pixels of the focus frame with the weight value of the corresponding pixel of the second center weight map, and an image feature in the focus frame after the point multiplication process is obtained. It can be understood that each of the pixels of the focus frame corresponds to each of the pixels of the second center weight map one-to-one.

In the present embodiment, a normalization process may be performed for the pixel value of each of the pixels after the pixel value of each of the pixels of the image in the focus frame is acquired, to reduce the calculation amount. Subsequently, the logarithm operation process is performed for the pixel value of each of the pixels, which has been processed by the normalization process.

In the present embodiment, after the logarithm operation process is performed for the obtained pixel value of each of the pixels of the image in the focus frame, that is, after the pixel value of each of the pixels is taken the logarithm of, the normalization process is performed for the logarithm of each of pixels. The point multiplication process is performed for each of the pixels of the focus frame, which has been processed by the normalization process, with the corresponding pixel of the second center weight map. After the point multiplication process, a pixel value of an edge of the image in the focus frame is approaching to 0, such that an attention on a center target region may be improved.

In the present embodiment, the logarithm operation process is performed for the pixel value of each of the pixels of the image in the focus frame. The point multiplication process is performed for each of the pixels of the image in the focus frame, which has been processed by the logarithm operation process, with the weight value of the corresponding pixel of the second center weight map. In this way, interference may be reduced, a center region of the image in the focus frame may be highlighted, and the target subject may be more easily to be identified.

Figure 10:
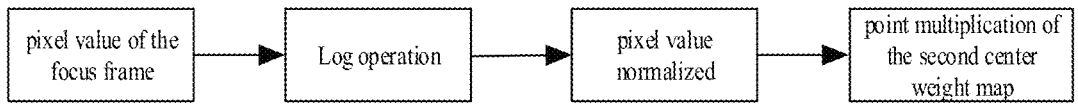
FIG. 10 is a schematic diagram of performing a point multiplication process for the image in the focus frame with a second center weight map according to some embodiments.

In FIG. 10, FIG. 10 is a schematic diagram of performing a point multiplication process for the image in the focus frame with a second center weight map according to some embodiments. The pixel value of each of the pixels of the image in the focus frame is acquired, the logarithm operation process is performed for each of the pixel values. Subsequently, the normalization process is performed for the logarithm of each of the pixels. The point multiplication process is performed for each of the pixels of the focus frame, which has been processed by the normalization process, with the corresponding pixel of the second center weight map.

Figure 11:
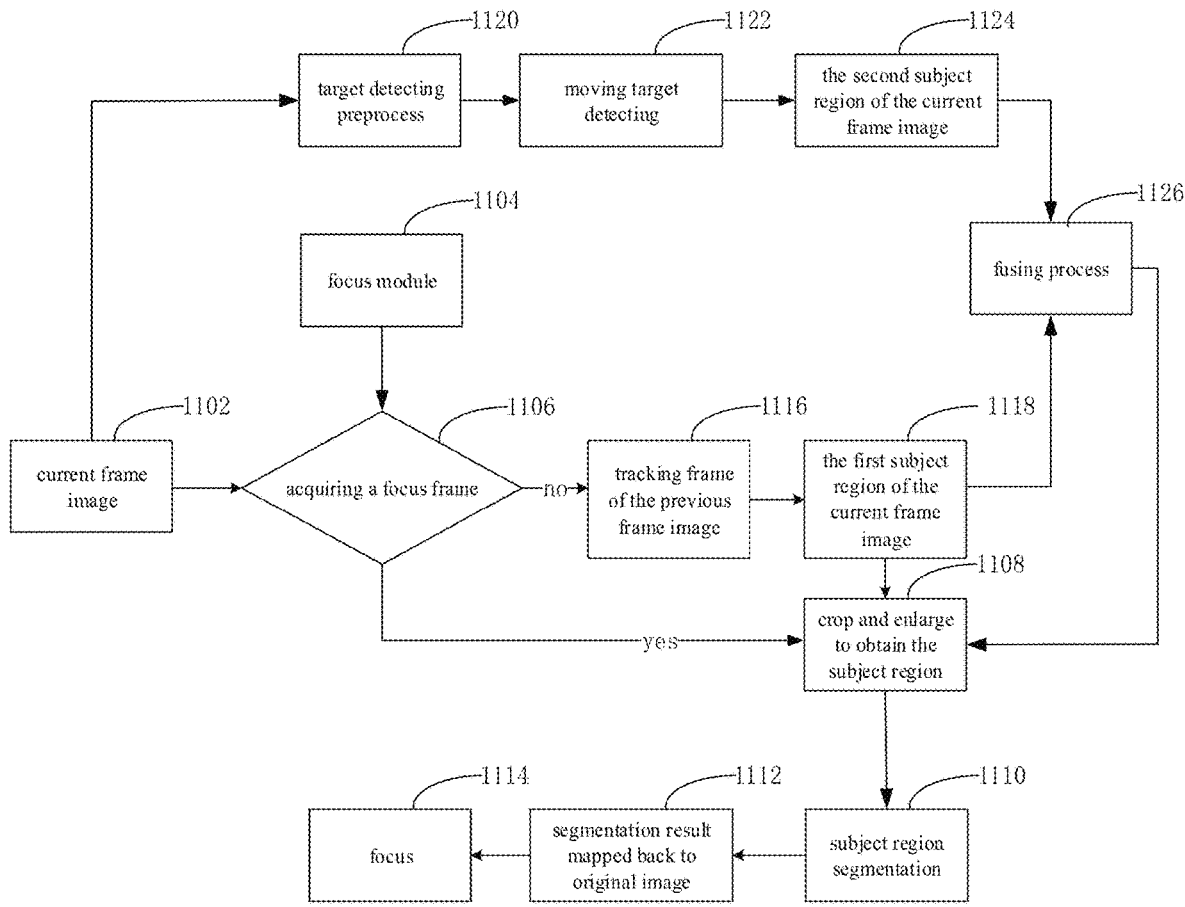
FIG. 11 is a flowchart of the subject detecting method according to other some embodiments.

In an embodiment, in FIG. 11, a current-frame image 1102 is acquired, an operation 1106 is performed by a focus module 1104. That is, that whether the current-frame image 1102 has the focus frame triggered by the user, is detected by the focus module 1104. In response to the current-frame image 1102 having the focus frame, an operation 1108 is performed, the focus frame is enlarged and cropped to obtain the target subject region. The target subject region is input into a subject segmentation region 1110, and a target subject of the current-frame image 1102 and a subject segmentation image are obtained.

An operation 1112 is performed, the subject segmentation image is mapped back to the current-frame image. The proportion of the subject segmentation image of the current-frame image relative to the current-frame image is determined. In response to the proportion of the subject segmentation image of the current-frame image relative to the current-frame image being less than the proportion threshold, the current-frame image is input into the subject segmentation network, the target subject in the current-frame image is obtained.

An operation 1114 is performed, the target subject is focused on to obtain a clear next-frame image of the target subject. The current-frame image is taken as the previous-frame image, and the next-frame image is taken as the current-frame. That whether the current-frame image has the focus frame triggered by the user, is detected. In response to the current-frame image having the focus frame, the target subject of the current-frame image is determined based on the image in the focus frame. In response to the current-frame image not having the focus frame, the tracking frame of the previous-frame image is acquired. The first center weight map is determined based on the tracking frame of the previous-frame image. The target subject of the current-frame image is obtained by traversing the current-frame image based on the first center weight map.

In response to the current-frame image not having the focus frame, an operation 1116 is performed. The tracking frame of the previous-frame image is acquired. The first center weight map is determined based on the tracking frame of the previous-frame image. The first subject region 1118 of the current-frame image is obtained by traversing the current-frame image based on the first center weight map. Subsequently, an operation 1120 is performed, the current-frame image is performed for a preprocess, such as a Gaussian filtering process, such that a high frequency noise brought by a complex background including a lot of texture details, of the image, and a high frequency noise brought by an image down-sampled process may be filtered out.

An operation 1122 is performed, that whether the current-frame image has the moving subject, which has been processed by the filtering process. In response to the current-frame image having the moving subject, the second subject region 1124 containing the moving subject is acquired.

An operation 1126 is performed, the fusing process is performed for the first subject region 1118 and the second subject region 1124. The operation 1108 is performed, the focus frame is enlarged and cropped to obtain the target subject region. The target subject region is input into the subject segmentation region 1110, and the target subject of the current-frame image 1102 and the subject segmentation image are obtained.

The operation 1112 is performed, the subject segmentation image is mapped back to the current-frame image. The proportion of the subject segmentation image of the current-frame image relative to the current-frame image is determined. In response to the proportion of the subject segmentation image of the current-frame image relative to the current-frame image being less than the proportion threshold, the current-frame image is input into the subject segmentation network and obtaining the target subject in the current-frame image.

The operation 1114 is performed, the target subject is focused on to obtain a clear next-frame image of the target subject. The current-frame image is taken as the previous-frame image, and the next-frame image is taken as the current-frame. That whether the current-frame image has the focus frame triggered by the user, is detected. In response to the current-frame image having the focus frame, the target subject of the current-frame image is determined based on the image in the focus frame. In response to the current-frame image not having the focus frame, the tracking frame of the previous-frame image is acquired. The first center weight map is determined based on the tracking frame of the previous-frame image. The target subject of the current-frame image is obtained by traversing the current-frame image based on the first center weight map, so as to obtain the target video having the clearer target subject.

It should be understood that, although various operations in the flowcharts of FIGS. 2 to 11 are shown in sequence as indicated by arrows, these operations are not necessarily performed sequentially in an order indicated by the arrows. Unless explicitly stated, there is no strict order limitation for execution of these operations, and these operations may be performed in other orders. Moreover, at least a part of the operations in FIGS. 2 to 11 may include multiple sub-operations or multiple stages. These sub-operations or stages are not necessarily performed at the same time, but may be performed at different times. The execution order of these sub-operations or stages is also not necessarily in sequence, but these sub-operations or stages may be executed with at least a part of, other operations, or sub-operations or stages of other operations in turn or alternately.

Figure 12:
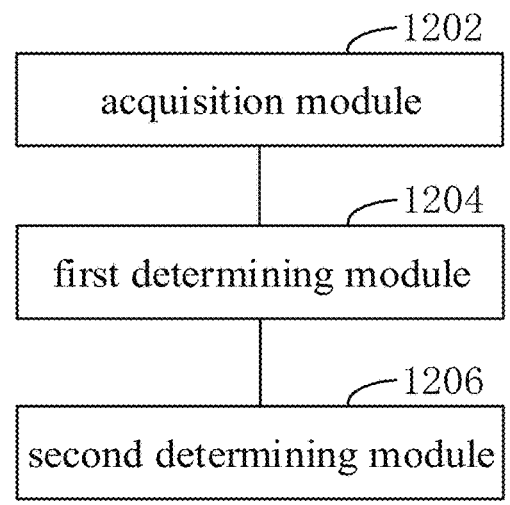
FIG. 12 is a structural block diagram of a subject detecting device according to some embodiments.

FIG. 12 is a structural block diagram of a subject detecting device according to some embodiments. In FIG. 12, the subject detecting device includes an acquisition module 1202, a first determining module 1204, and a second determining module 1206.

The acquisition module 1202 is configured to acquire a current-frame image and detect whether the current-frame image has a focus frame triggered by a user, is detected.

The first determining module 1204 is configured to, in response to the current-frame image having the focus frame, determine a target subject of the current-frame image based on an image in the focus frame.

The second determining module 1206 is configured to, in response to the current-frame image not having the focus frame, acquire a tracking frame of a previous-frame image previous to the current-frame image, determine a first center weight map based on the tracking frame of the previous-frame image, and obtain the target subject of the current-frame image by traversing the current-frame image based on the first center weight map. Each of pixels of the first center weight map has a corresponding weight value, weight values of the pixels of the first center weight map are gradually reduced from a center to each edge thereof, and the tracking frame shows a region where the target subject is located in the previous-frame image.

According to the subject detecting device in the present embodiment, the current-frame image is acquired, and whether the current-frame image has the focus frame triggered by the user, is detected. In response to the current-frame image having the focus frame, the target subject of the current-frame image is determined based on the image in the focus frame. The target subject may be determined quickly and simply. In response to the current-frame image not having the focus frame, the tracking frame of the previous-frame image previous to the current-frame image is acquired, the first center weight map is determined based on the tracking frame of the previous-frame image, and the target subject of the current-frame image is obtained by traversing the current-frame image based on the first center weight map. Each of the pixels of the first center weight map has the corresponding weight value, weight values of the pixels of the first center weight map are gradually reduced from the center to each edge thereof. In this way, the target subject in the current-frame image may be identified more accurately.

In an embodiment, the second determining module 1206 is further configured to obtain a plurality of candidate frames by sliding the first center weight map on the current-frame image, acquire a first image feature of each of the candidate frames, and obtain a response value corresponding to each of the candidate frames by performing a convolution process for the first image feature of each of the candidate frames with a target filter, and determine the target subject of the current-frame image based on a candidate frame corresponding to a maximal one of response values.

In the present embodiment, each of the candidate frames is obtained by traversing the current-frame image through the first center weight map. The first image feature in each of the candidate frames is acquired. The response value corresponding to each of the candidate frames by performing the convolution process for the first image feature in each of the candidate frames with the target filter. The target subject of the current-frame image is determined based on the candidate frame corresponding to the maximal one of the response values. The candidate frame corresponding to the maximal one of the response values is most likely to have the target subject, such that the target subject in the image may be identified accurately.

In an embodiment, the second determining module 1206 is further configured to acquire a second image feature of each of the candidate frames. The second image feature including pixel values of pixels of each of the candidate frames obtained by sliding the first center weight map on the current-frame image.

A point multiplication process is performed for a pixel value of each of the pixels of each of the candidate frames with a weight value of a corresponding pixel of the first center weight map, and the first image feature of each of the candidate frames is obtained.

In the present embodiment, the second image feature of each of the candidate frames is acquired. The second image feature includes pixel values of pixels of each of the candidate frames obtained by the first center weight map being slid on the current-frame image. The point multiplication process is performed for the pixel value of each of the pixels of each of the candidate frames with the weight value of the corresponding pixel of the first center weight map, and the first image feature of each of the candidate frames is obtained. In this way, the center region of the image may be highlighted, and the target subject may be identified more easily.

In an embodiment, the second determining module 1206 is further configured to perform a logarithm operation process for the pixel value of each of the pixels of each of the candidate frames, and perform the point multiplication process for the pixel value of each of the pixels of each of the candidate frames, which has been processed by the logarithm operation process, with the weight value of the corresponding pixel of the first center weight map.

In the present embodiment, the logarithm operation process is performed for the pixel value of each of pixels of the candidate frame, such that interference of a contrast region on target tracking may be reduced. The point multiplication process is performed for the pixel value of each of the pixels of the image in the focus frame, which has been processed by the logarithm operation process, with the weight value of the corresponding pixel of the first center weight map, such that the center region of the image may be highlighted, and the target subject may be identified more easily.

In an embodiment, the second determining module 1206 is further configured to take the candidate frame corresponding to the maximal one of the response values as a first subject region of the current-frame image, and input the first subject region of the current-frame image into a subject segmentation network, and obtain the target subject of the current-frame image.

In the present embodiment, the candidate frame corresponding to the maximal one of the response values is taken as the first subject region of the current-frame image, the first subject region of the current-frame image is input into the subject segmentation network, and the target subject in the current-frame image is obtained. The region where the target subject is located may be determined by the response values, and the region containing the target subject may be input into the subject segmentation network so as to quickly detect the target subject in the current-frame image.

In an embodiment, the second determining module 1206 is further configured to determine a height and a width of the candidate frame corresponding to the maximal one of the response values, add the height of the candidate frame with a preset height, add the width of the candidate frame with a preset width, and take a candidate frame obtained by adding with the preset height and the preset width as the first subject region of the current-frame image.

In the present embodiment, the height and the width of the candidate frame corresponding to the maximal one of the response values are determined. The height of the candidate frame is added with the preset height, and the width of the candidate frame is added with the preset width. The candidate frame obtained by adding with the preset height and the preset width is taken as the first subject region of the current-frame image, such that a complete region where the target subject is located may be determined accurately, and a possibility of a part absence of the detected target subject as a result of the candidate frame being too small may be reduced.

In an embodiment, the second determining module 1206 is further configured to detect whether the current-frame image has a moving subject; in response to the current-frame image having the moving subject, acquire a second subject region including the moving subject, and perform a fusing process for the first subject region and the second subject region, input a subject region obtained by the fusing process into the subject segmentation network, and obtain the target subject of the current-frame image.

In the present embodiment, that whether the current-frame image has the moving subject is determined. In response to the current-frame image having the moving subject, the second subject region containing the moving subject is acquired. The fusing process is performed for the first subject region and the second subject region, the subject region obtained by the fusing process is input into the subject segmentation network, and the target subject of the current-frame image is obtained. In this way, a more accurate target subject may be obtained.

In an embodiment, after the first subject region of the current-frame image is obtained, the device further includes an update module. The update module is configured to update the target filter based on the first subject region of the current-frame image.

The filter is updated based on the first subject region of the current-frame image, such that interference to the subject detection in aspect of illumination, posture, scale, and so on, may be reduced.

In an embodiment, the first determining module 1204 is further configured to determine a height and a width of the focus frame in response to the current-frame image having the focus frame, add the height of the focus frame with a preset height, and adding the width of the focus frame with a preset width, take a focus frame obtained by adding with the preset height and the preset width as the first subject region of the current-frame image, input the first subject region of the current-frame image into the subject segmentation network, and obtain the target subject in the current-frame image.

According to the subject detecting device in the present embodiment, in response to the current-frame image having the focus frame, the height and the width of the focus frame are determined. The height of the focus frame is added with the preset height, and the width of the focus frame is added with the preset width. The focus frame obtained by adding with the preset height and the preset width is taken as the first subject region of the current-frame image, such that the complete region where the target subject is located may be determined accurately, and the possibility of a part absence of the detected target subject as a result of the target subject moving but the size of the focus frame not being changed may be reduced.

In an embodiment, the first determining module 1204 is further configured to acquire a subject segmentation image of the previous-frame image, input the subject segmentation image of the previous-frame image and the first subject region of the current-frame image into the subject segmentation network, and obtain the target subject of the current-frame image. The subject position information of the previous-frame image is brought into the network through the subject segmentation image of the previous-frame image brings, such that the segmentation effect of the network in a video scene may be improved.

In an embodiment, the first determining module 1204 is further configured to acquire a subject segmentation image of the previous-frame image, input the subject segmentation image of the previous-frame image and the first subject region of the current-frame image into the subject segmentation network, and obtain the target subject of the current-frame image; determine a proportion of the subject segmentation image of the current-frame image relative to the current-frame image; and in response to the proportion of the subject segmentation image of the current-frame image relative to the current-frame image being less than a proportion threshold, input the current-frame image into the subject segmentation network, and obtain the target subject of the current-frame image.

In the present embodiment, the subject segmentation image of the previous-frame image may be acquired, the subject segmentation image of the previous-frame image and the first subject region of the current-frame image are input into the subject segmentation network, and the subject segmentation image of the current-frame image is obtained. The proportion of the subject segmentation image of the current-frame image relative to the current-frame image is determined. That whether there is the target subject in a current detection result and whether the detected target subject is complete may be determined based on whether the proportion is greater than the proportion threshold. In response to the proportion of the subject segmentation image of the current-frame image relative to the current-frame image being less than the proportion threshold, it is indicated that the detection is not accurate and the target subject is not complete. Then, the current-frame image is input into the subject segmentation network, so as to obtain the target subject in the current-frame image.

In an embodiment, the device further includes a generating device. The generating device is configured to acquire the second center weight map corresponding to the focus frame. Each of the pixels of the second center weight map has the corresponding weight value, and the weight values of the second center weight map are gradually reduced from the center to each edge thereof. The generating device is further configured to perform the point multiplication process for the pixel value of each of the pixels of the image in the focus frame with the weight value of the corresponding pixel of the second center weight map, perform the affine transformation process for the image in the focus frame, which has been processed by the point multiplication process, and obtain a preset number of images in transformation frames; and train the initial filter based on the preset number of images in the transformation frames, in response to the preset condition being satisfied, the target filter is obtained.

In the present embodiment, the second center weight map corresponding to the focus frame is acquired. Each of the pixels of the second center weight map has the corresponding weight value, and the weight values of the second center weight map are gradually reduced from the center to each edge thereof. The point multiplication process is performed for the image in the focus frame with the second center weight map. The affine transformation process is performed for the image in the focus frame, which has been processed by the point multiplication process, and the preset number of the images in the transformation frames are obtained. The initial filter is trained based on the preset number of images in the transformation frames. In response to the preset condition being satisfied, the target filter may be obtained, so as to obtain the trained target filter.

In an embodiment, the first determining module 1204 is further configured to perform a logarithm operation process for the pixel value of each of the pixels of the image in the focus frame, and perform the point multiplication process for the pixel value of each of the pixels of the image in the focus frame, which has been processed by the logarithm operation process, with the weight value of the corresponding pixel of the second center weight map.

In the present embodiment, the logarithm operation process is performed for the pixel value of each of the pixels of the image in the focus frame. The point multiplication process is performed for the pixel value of each of the pixels of the image in the focus frame, which has been processed by the logarithm operation process, with the weight value of the corresponding pixel of the second center weight map. In this way, the interference may be reduced, the center region of the image in the focus frame may be highlighted, and the target subject may be more easily to be identified.

The division of each of modules in the subject detecting device is only for illustration. In other embodiments, the subject detecting device may be divided into different modules as needs to complete all or part of functions of the subject detecting device.

Figure 13:
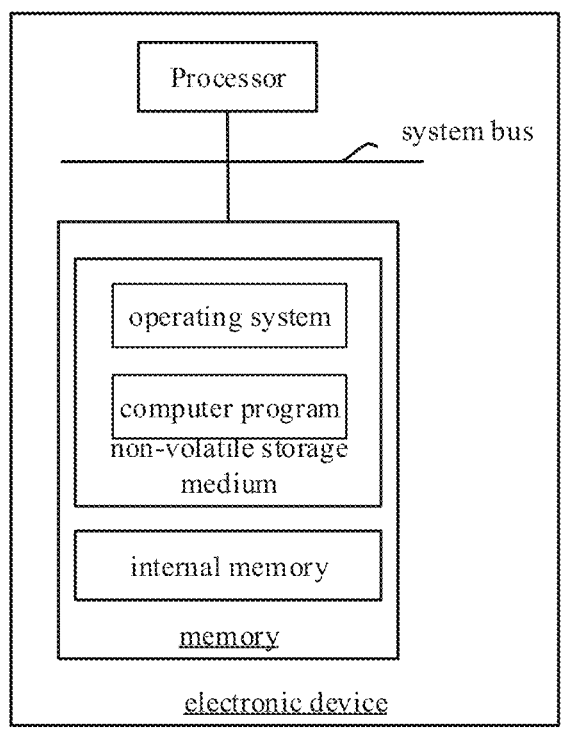
FIG. 13 is a schematic diagram of an internal structure of an electronic device according to some embodiments.

FIG. 13 is a schematic diagram of an internal structure of an electronic device according to some embodiments. In FIG. 13, the electronic device includes a processor and a memory connected to the processor through a system bus. The processor is configured to provide a calculation and a control capability Among them, the processor is used to provide calculation and control capabilities to support an operation of the entire electronic device. The memory may include a non-volatile storage medium and an internal memory. The non-volatile storage medium stores an operating system and a computer program. The computer program may be executed by the processor to implement a subject detecting method provided in the following various embodiments. The internal memory provides a cached operating environment for an operating system computer program in the non-volatile storage medium. The electronic device may be a mobile phone, a tablet computer, or a personal digital assistant or a wearable device.

The implementation of each of modules in the subject detecting device provided in the embodiments of the present disclosure may be in a form of a computer program. The computer program may be run on a terminal or a server. A program module composed of the computer program may be stored in a memory of the terminal or the server. When the computer program is executed by the processor, an operation of the method described in the embodiments of the present disclosure is realized.

A non-transitory computer-readable storage medium is further provided in the embodiments of the present disclosure. One or more non-volatile computer-readable storage mediums containing computer-executable instructions, when the computer-executable instructions are executed by one or more processors, the processors are configured to perform the operations of the subject detecting method.

A computer program product containing instructions, when run on a computer, the computer is configured to execute a subject detecting method.

Any reference to a memory, a storage, a database, or other media used in the embodiments of the present disclosure may include a non-volatile and/or volatile memory. A suitable non-volatile memory may include a read only memory (ROM), a programmable ROM (PROM), an electrically programmable ROM (EPROM), an electrically erasable programmable ROM (EEPROM), or a flash memory. The volatile memory may include a random access memory (RAM), acting as an external cache memory. As an illustration but not a limitation, RAM is available in many forms, such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus direct RAM (RDRAM), direct Rambus dynamic RAM (DRDRAM), and Rambus dynamic RAM (RDRAM).

Each of the technical features of the above-mentioned embodiments may be combined arbitrarily. In order to make the description concise, all possible combinations of the various technical features in the above-mentioned embodiments are not described. However, as long as there is no contradiction in the combination of these technical features, the combination should be regarded to be within the scope of the present disclosure.

Only several implementations of the present disclosure are expressed in the above-mentioned embodiments. The descriptions are specific and detailed, but should not be thus understood to be limitations of the present disclosure scope. It should be pointed out, for those of ordinary skill in the art, without departing from a concept of the present disclosure, several modifications and improvements may be made, which all fall within a protection scope of the present disclosure. Therefore, the protection scope of the present disclosure patent shall be subject to the appended claims.

What is claimed is:

1. A subject detecting method, comprising:
   acquiring a current-frame image, and detecting whether the current-frame image has a focus frame triggered by a user;
   in response to the current-frame image having the focus frame, determining a target subject of the current-frame image based on an image in the focus frame; and
   in response to the current-frame image not having the focus frame, acquiring a tracking frame of a previous-frame image previous to the current-frame image, determining a first center weight map based on the tracking frame of the previous-frame image, and obtaining the target subject of the current-frame image by traversing the current-frame image based on the first center weight map;
   wherein each of pixels of the first center weight map has a corresponding weight value, weight values of the pixels of the first center weight map are gradually reduced from a center to each edge thereof, and the tracking frame shows a region where the target subject is located in the previous-frame image.

2. The method according to claim 1, wherein the obtaining the target subject of the current-frame image by traversing the current-frame image based on the first center weight map, comprises:
   obtaining a plurality of candidate frames by sliding the first center weight map on the current-frame image;
   acquiring a first image feature of each of the candidate frames, obtaining a response value corresponding to each of the candidate frames by performing a convolution process for the first image feature of each of the candidate frames with a target filter; and
   determining the target subject of the current-frame image based on a candidate frame corresponding to a maximal one of response values.

3. The method according to claim 2, wherein the acquiring the first image feature of each of the candidate frames, comprises:
   acquiring a second image feature of each of the candidate frames, wherein the second image feature comprises pixel values of pixels of each of the candidate frames obtained by sliding the first center weight map on the current-frame image; and
   performing a point multiplication process for a pixel value of each of the pixels of each of the candidate frames with a weight value of a corresponding pixel of the first center weight map, and obtaining the first image feature of each of the candidate frames.

4. The method according to claim 3, wherein the performing the point multiplication process for the pixel value of each of the pixels of each of the candidate frames with the weight value of the corresponding pixel of the first center weight map, comprises:
   performing a logarithm operation process for the pixel value of each of the pixels of each of the candidate frames; and
   performing the point multiplication process for the pixel value of each of the pixels of each of the candidate frames, which has been processed by the logarithm operation process, with the weight value of the corresponding pixel of the first center weight map.

5. The method according to claim 2, wherein the determining the target subject of the current-frame image based on the candidate frame corresponding to the maximal one of the response values, comprises:
taking the candidate frame corresponding to the maximal one of the response values as a first subject region of the current-frame image; and
inputting the first subject region of the current-frame image into a subject segmentation network, and obtaining the target subject of the current-frame image.

6. The method according to claim 5, wherein the taking the candidate frame corresponding to the maximal one of the response values as the first subject region of the current-frame image, comprises:
determining a height and a width of the candidate frame corresponding to the maximal one of the response values;
adding the height of the candidate frame with a preset height, and adding the width of the candidate frame with a preset width; and
taking a candidate frame obtained by adding with the preset height and the preset width as the first subject region of the current-frame image.

7. The method according to claim 5, wherein the inputting the first subject region of the current-frame image into the subject segmentation network, and obtaining the target subject of the current-frame image, comprises:
detecting whether the current-frame image has a moving subject;
in response to the current-frame image having the moving subject, acquiring a second subject region comprising the moving subject; and
performing a fusing process for the first subject region and the second subject region, inputting a subject region obtained by the fusing process into the subject segmentation network, and obtaining the target subject of the current-frame image.

8. The method according to claim 7, wherein the detecting whether the current-frame image has the moving subject, comprises:
performing a background subtraction process for the current-frame image, and obtaining a binary image corresponding to the current-frame image;
performing a connected component process for the binary image, and obtaining an area size of each of candidate subjects in the binary image;
in response to any one of the area size of each of the candidate subjects being larger than or equal to an area threshold, determining that the current-frame image has the moving subject; and
in response to all the area size of each of the candidate subjects being less than the area threshold, determining that the current-frame image does not have the moving subject.

9. The method according to claim 5, wherein after the obtaining the target subject of the current-frame image, the method further comprises:
updating the target filter based on the first subject region of the current-frame image.

10. The method according to claim 5, wherein the current-frame determining the target subject of the current-frame image based on the image in the focus frame, in response to the current-frame image having the focus frame, comprises:
in response to the current-frame image having the focus frame, determining a height and a width of the focus frame;
adding the height of the focus frame with a preset height, and adding the width of the focus frame with a preset width;
taking a focus frame obtained by adding with the preset height and the preset width as the first subject region of the current-frame image; and
inputting the first subject region of the current-frame image into the subject segmentation network, and obtaining the target subject in the current-frame image.

11. The method according to claim 5, wherein the inputting the first subject region of the current-frame image into the subject segmentation network, and obtaining the target subject of the current-frame image, comprises:
acquiring a subject segmentation image of the previous-frame image, inputting the subject segmentation image of the previous-frame image and the first subject region of the current-frame image into the subject segmentation network, and obtaining the target subject of the current-frame image.

12. The method according to claim 5, wherein the inputting the first subject region of the current-frame image into the subject segmentation network, and obtaining the target subject of the current-frame image, comprises:
acquiring a subject segmentation image of the previous-frame image, inputting the subject segmentation image of the previous-frame image and the first subject region of the current-frame image into the subject segmentation network, and obtaining a subject segmentation image of the current-frame image;
determining a proportion of the subject segmentation image of the current-frame image relative to the current-frame image; and
in response to the proportion of the subject segmentation image of the current-frame image relative to the current-frame image being less than a proportion threshold, inputting the current-frame image into the subject segmentation network, and obtaining the target subject of the current-frame image.

13. The method according to claim 2, wherein the target filter is obtained by a manner, which comprises:
acquiring a second center weight map corresponding to the focus frame, wherein each of pixels of the second center weight map has a corresponding weight value, and weight values of the pixels of the second center weight map are gradually reduced from a center to each edge thereof;
performing a point multiplication process for a pixel value of each of the pixels of the image in the focus frame with a weight value of a corresponding pixel of the second center weight map;
performing an affine transformation process for the image in the focus frame, which has been processed by the point multiplication process, and obtaining a preset number of images in transformation frames; and
training an initial filter based on the preset number of images in the transformation frames, and obtaining the target filter in response to a preset condition being satisfied.

14. The method according to claim 13, wherein the performing the point multiplication process for the pixel value of each of the pixels of the image in the focus frame with the weight value of the corresponding pixel of the second center weight map, comprises:

performing a logarithm operation process for the pixel value of each of the pixels of the image in the focus frame; and performing the point multiplication process for the pixel value of each of the pixels of the image in the focus frame, which has been processed by the logarithm operation process, with the weight value of the corresponding pixel of the second center weight map.

15. The method according to claim 14, wherein the performing the point multiplication process for the pixel value of each of the pixels of the image in the focus frame, which has been processed by the logarithm operation process, with the weight value of the corresponding pixel of the second center weight map, comprises:

performing a normalization process for the pixel value of each of the pixels of the image in the focus frame, which has been processed by the logarithm operation process; and performing the point multiplication process for the pixel value of each of the pixels of the image in the focus frame, which has been processed by the normalization process, with the weight value of the corresponding pixel of the second center weight map.

16. An electronic device, comprising:
a memory, configured to store computer programs; and
a processor;
wherein when the computer programs are executed by the processor, the processor is configured to perform operations of:

acquiring a current-frame image, and detecting whether the current-frame image has a focus frame triggered by a user;

in response to the current-frame image having the focus frame, determining a target subject of the current-frame image based on an image in the focus frame; and in response to the current-frame image not having the focus frame, acquiring a tracking frame of a previous-frame image previous to the current-frame image, determining a first center weight map based on the tracking frame of the previous-frame image, and obtaining the target subject of the current-frame image by traversing the current-frame image based on the first center weight map;

wherein each of pixels of the first center weight map has a corresponding weight value, weight values of the pixels of the first center weight map are gradually reduced from a center to each edge thereof, and the tracking frame shows a region where the target subject is located in the previous-frame image.

17. The device according to claim 16, wherein the processor is further configured to perform operations of:

obtaining a plurality of candidate frames by sliding the first center weight map on the current-frame image;

acquiring a first image feature of each of the candidate frames, obtaining a response value corresponding to each of the candidate frames by performing a convolution process for the first image feature of each of the candidate frames with a target filter; and determining the target subject of the current-frame image based on a candidate frame corresponding to a maximal one of response values.

18. The device according to claim 17, wherein the processor is further configured to perform operations of:

acquiring a second image feature of each of the candidate frames, wherein the second image feature comprises pixel values of pixels of each of the candidate frames obtained by sliding the first center weight map on the current-frame image; and performing a point multiplication process for a pixel value of each of the pixels of each of the candidate frames with a weight value of a corresponding pixel of the first center weight map, and obtaining the first image feature of each of the candidate frames.

19. The device according to claim 18, wherein the processor is further configured to perform operations of:

performing a logarithm operation process for the pixel value of each of the pixels of each of the candidate frames; and performing the point multiplication process for the pixel value of each of the pixels of each of the candidate frames, which has been processed by the logarithm operation process, with the weight value of the corresponding pixel of the first center weight map.

20. A non-transitory computer-readable storage medium, configured to store computer programs, wherein when the computer programs are executed by a processor, performing operations of:

acquiring a current-frame image, and detecting whether the current-frame image has a focus frame triggered by a user;

in response to the current-frame image having the focus frame, determining a target subject of the current-frame image based on an image in the focus frame; and in response to the current-frame image not having the focus frame, acquiring a tracking frame of a previous-frame image previous to the current-frame image, determining a first center weight map based on the tracking frame of the previous-frame image, and obtaining the target subject of the current-frame image by traversing the current-frame image based on the first center weight map;

wherein each of pixels of the first center weight map has a corresponding weight value, weight values of the pixels of the first center weight map are gradually reduced from a center to each edge thereof, and the tracking frame shows a region where the target subject is located in the previous-frame image.

* * * * *